US012593209B2

(12) United States Patent (10) Patent No.: US 12,593,209 B2
Normann et al. (45) Date of Patent: Mar. 31, 2026

(54) SECONDARY OR SPLICE-SPECIFIC ACCESS CONTROL IN A WIRELESS COMMUNICATION NETWORK

(71) Applicant: Telefonaktiebolaget LM Ericsson (publ), Stockholm (SE)

(72) Inventors: Henrik Normann, Malmö (SE); Peter Hedman, Helsingborg (SE); David Castellanos Zamora, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 610 days.

(21) Appl. No.: 17/923,929

(22) PCT Filed: May 12, 2021

(86) PCT No.: PCT/EP2021/062612
§ 371 (c)(1),
(2) Date: Nov. 8, 2022

(87) PCT Pub. No.: WO2021/228932
PCT Pub. Date: Nov. 18, 2021

(65) Prior Publication Data
US 2023/0171598 A1 Jun. 1, 2023

Related U.S. Application Data

(60) Provisional application No. 63/024,484, filed on May 13, 2020.

(51) Int. Cl.
*H04W 12/08* (2021.01)
*H04W 8/18* (2009.01)
(Continued)

(52) U.S. Cl.
CPC ............. *H04W 12/08* (2013.01); *H04W 8/18* (2013.01); *H04W 12/40* (2021.01); *H04W 12/72* (2021.01); *H04W 48/18* (2013.01); *H04W 12/06* (2013.01)

(58) Field of Classification Search
CPC ..... H04W 12/08; H04W 12/40; H04W 12/72; H04W 8/18; H04W 48/18; H04W 12/06
See application file for complete search history.

(56) References Cited

U.S. PATENT DOCUMENTS

2020/0267554 A1* 8/2020 Faccin .................. H04L 63/101

OTHER PUBLICATIONS

3GPP, "3GPP TS 23.502 V16.4.0", 3rd Generation Partnership Project; Technical Specification Group Services and System Aspects; Procedures for the 5G System (5GS); Stage 2 (Release 16), Mar. 2020, 1-582.

(Continued)

*Primary Examiner* — Wayne H Cai
(74) *Attorney, Agent, or Firm* — Murphy, Bilak & Homiller, PLLC

(57) ABSTRACT

A data management network node (12) is configured for use in a wireless communication network (10). The data management network node (12) stores subscription data (14) for a wireless device (16). The data management network node (12) receives, from network equipment (26), a request that requests subscription data (14) for the wireless device (16). Responsive to the request, the data management network node (12) transmits to the network equipment (26) a response that includes at least some of the stored subscription data (14). If the subscription data (14) included in the response indicates the wireless device (16) is subscribed to use a certain data network or network slice that is subject to secondary or slice-specific access control, the subscription data (14) included in the response includes a least one generic subscription identifier for the wireless device (16).

16 Claims, 16 Drawing Sheets

STORING SUBSCRIPTION DATA FOR A WIRELESS DEVICE, WHEREIN THE STORED SUBSCRIPTION DATA INDICATES THE WIRELESS DEVICE IS SUBSCRIBED TO USE A CERTAIN DATA NETWORK OR NETWORK SLICE, WHEREIN THE CERTAIN DATA NETWORK OR NETWORK SLICE IS SUBJECT TO SECONDARY OR SLICE-SPECIFIC ACCESS CONTROL.
300

RECEIVING, FROM NETWORK EQUIPMENT, A REQUEST THAT REQUESTS SUBSCRIPTION DATA FOR THE WIRELESS DEVICE
310

RESPONSIVE TO THE REQUEST, TRANSMITTING TO THE NETWORK EQUIPMENT A RESPONSE THAT INCLUDES AT LEAST SOME OF THE STORED SUBSCRIPTION DATA, WHEREIN THE RESPONSE INDICATES OR DOES NOT INDICATE THE WIRELESS DEVICE IS SUBSCRIBED TO USE THE CERTAIN DATA NETWORK OR NETWORK SLICE, DEPENDING RESPECTIVELY ON WHETHER OR NOT THE STORED SUBSCRIPTION DATA INCLUDES A GENERIC SUBSCRIPTION IDENTIFIER FOR THE WIRELESS DEVICE
320

(51) Int. Cl.
| | |
|---|---|
| *H04W 12/40* | (2021.01) |
| *H04W 12/72* | (2021.01) |
| *H04W 48/18* | (2009.01) |
| *H04W 12/06* | (2021.01) |

(56) References Cited

OTHER PUBLICATIONS

3GPP, "3rd Generation Partnership Project; Technical Specification Group Services and System Aspects; Security architecture and procedures for 5G system (Release 16)", 3GPP TS 33.501 V16.2.0, Mar. 2020, 227 pages.

3GPP, "3GPP TR 23.740 V16.0.0", 3rd Generation Partnership Project; Technical Specification Group Services and System Aspects; Study on Enhancement of Network Slicing (Release 16), Dec. 2018, 1-70.

3GPP, "3GPP TS 23.122 V16.6.0", 3rd Generation Partnership Project; Technical Specification Group Core Network and Terminals; Non-Access-Stratum (NAS) functions related to Mobile Station (MS) in idle mode (Release 16), Jun. 2020, 1-81.

3GPP, "3GPP TS 23.501 V16.4.0", 3rd Generation Partnership Project; Technical Specification Group Services and System Aspects; System architecture for the 5G System (5GS); Stage 2 (Release 16), Mar. 2020, 1-430.

3GPP, "3GPP TS 24.501 V16.4.1", 3rd Generation Partnership Project; Technical Specification Group Core Network and Termi-nals; Non-Access-Stratum (NAS) protocol for 5G System (5GS); Stage 3; (Release 16), Mar. 2020, 1-666.

3GPP, "3GPP TS 29.413 V15.3.0", 3rd Generation Partnership Project; Technical Specification Group Radio Access Network; Application of the NG Application Protocol (NGAP) to non-3GPP access (Release 15), Sep. 2019, 1-10.

3Gpp, "3GPP Ts 29.501 V16.3.0", 3rd Generation Partnership Project; Technical Specification Group Core Network and Termi-nals; 5G System; Principles and Guidelines for Services Definition; Stage 3 (Release 16), 2020-03, 1-70.

3GPP, "3GPP TS 29.561 V16.3.0", 3rd Generation Partnership Project; Technical Specification Group Core Network and Termi-nals; 5G System; Interworking between 5G Network and external Data Networks; Stage 3 (Release 16), Mar. 2020, 1-65.

3GPP, "3GPP TS 38.413 V15.7.0", 3rd Generation Partnership Project; Technical Specification Group Radio Access Network; NG-RAN; NG Application Protocol (NGAP) (Release 15), Mar. 2020, 1-331.

Huawei, et al., "Draft living CR for network slice specific authen-tication and authorization clauses", 3GPP TSG-SA3 Meeting #99-e, S3-201067, revision of S3-200807, e-meeting, May 11-15, 2020, 1-9.

Nec, et al., "Release PDU sessions due to revocation from AAA server or re-auth failure", SA WG2 Meeting #137E (e-meeting), S2-2002360 (revision of S2-2001622, S2-2002283), Elbonia, Feb. 24-27, 2020, 1-11.

* cited by examiner

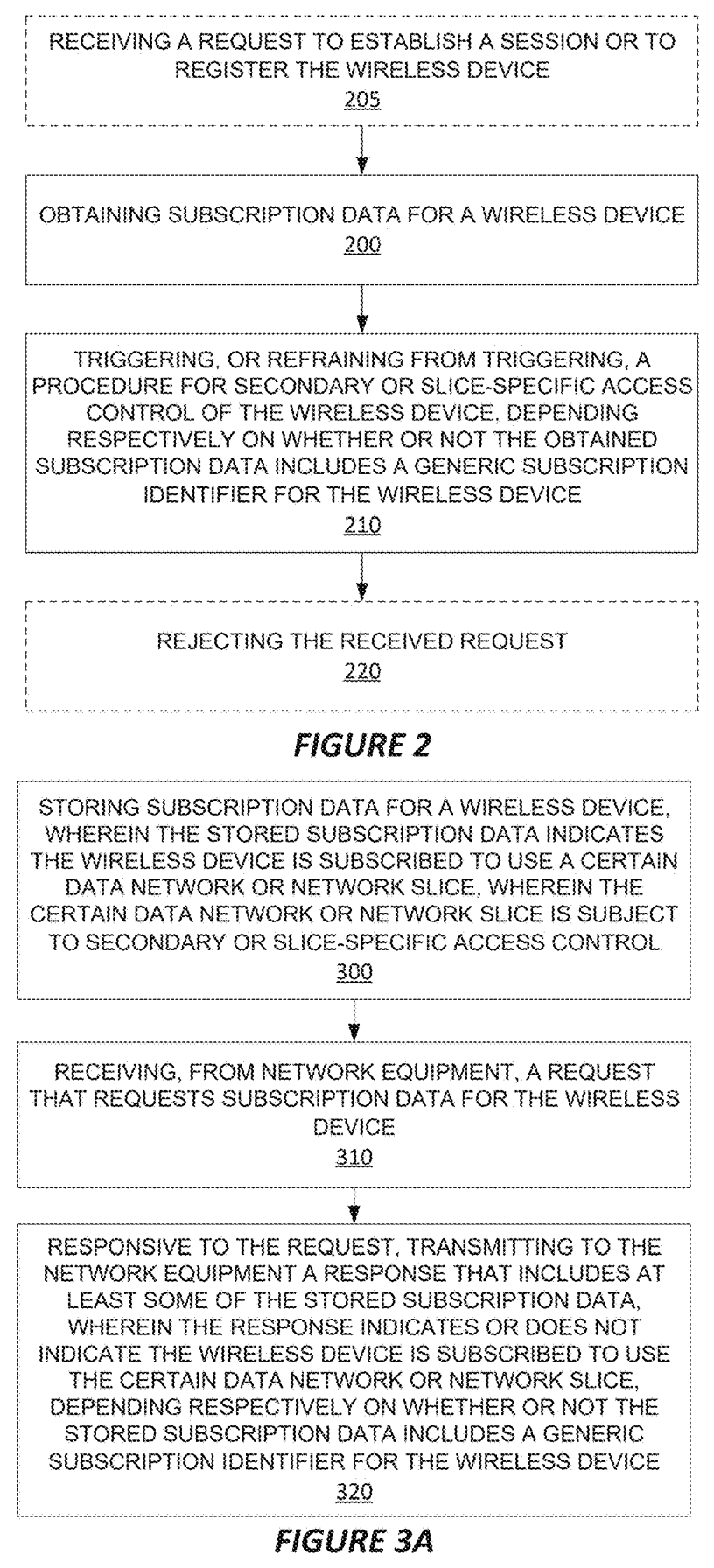

RECEIVING A REQUEST TO ESTABLISH A SESSION OR TO REGISTER THE WIRELESS DEVICE
205

OBTAINING SUBSCRIPTION DATA FOR A WIRELESS DEVICE
200

TRIGGERING, OR REFRAINING FROM TRIGGERING, A PROCEDURE FOR SECONDARY OR SLICE-SPECIFIC ACCESS CONTROL OF THE WIRELESS DEVICE, DEPENDING RESPECTIVELY ON WHETHER OR NOT THE OBTAINED SUBSCRIPTION DATA INCLUDES A GENERIC SUBSCRIPTION IDENTIFIER FOR THE WIRELESS DEVICE
210

REJECTING THE RECEIVED REQUEST
220

*FIGURE 2*

STORING SUBSCRIPTION DATA FOR A WIRELESS DEVICE, WHEREIN THE STORED SUBSCRIPTION DATA INDICATES THE WIRELESS DEVICE IS SUBSCRIBED TO USE A CERTAIN DATA NETWORK OR NETWORK SLICE, WHEREIN THE CERTAIN DATA NETWORK OR NETWORK SLICE IS SUBJECT TO SECONDARY OR SLICE-SPECIFIC ACCESS CONTROL
300

RECEIVING, FROM NETWORK EQUIPMENT, A REQUEST THAT REQUESTS SUBSCRIPTION DATA FOR THE WIRELESS DEVICE
310

RESPONSIVE TO THE REQUEST, TRANSMITTING TO THE NETWORK EQUIPMENT A RESPONSE THAT INCLUDES AT LEAST SOME OF THE STORED SUBSCRIPTION DATA, WHEREIN THE RESPONSE INDICATES OR DOES NOT INDICATE THE WIRELESS DEVICE IS SUBSCRIBED TO USE THE CERTAIN DATA NETWORK OR NETWORK SLICE, DEPENDING RESPECTIVELY ON WHETHER OR NOT THE STORED SUBSCRIPTION DATA INCLUDES A GENERIC SUBSCRIPTION IDENTIFIER FOR THE WIRELESS DEVICE
320

*FIGURE 3A*

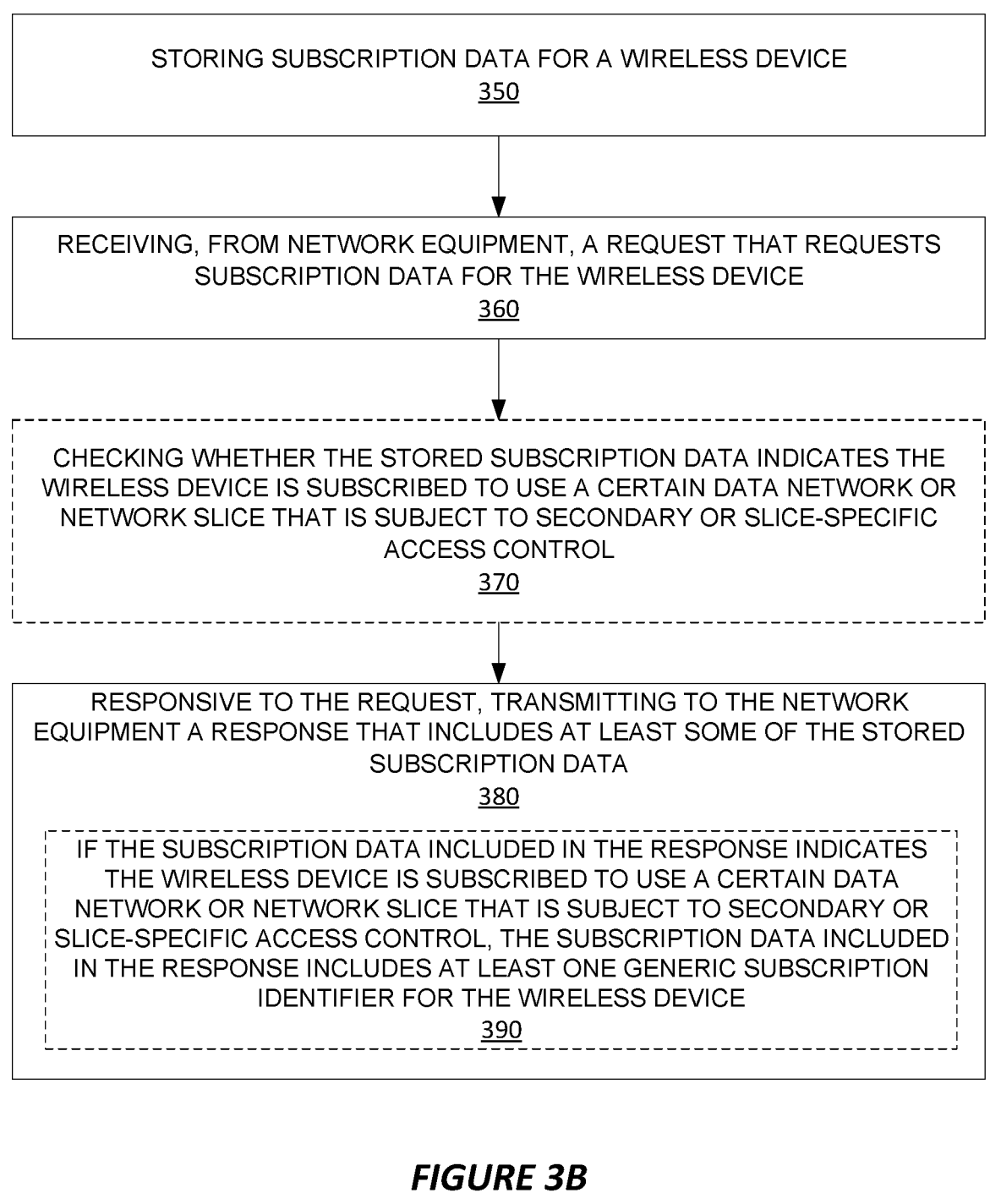

STORING SUBSCRIPTION DATA FOR A WIRELESS DEVICE
350

RECEIVING, FROM NETWORK EQUIPMENT, A REQUEST THAT REQUESTS
SUBSCRIPTION DATA FOR THE WIRELESS DEVICE
360

CHECKING WHETHER THE STORED SUBSCRIPTION DATA INDICATES THE
WIRELESS DEVICE IS SUBSCRIBED TO USE A CERTAIN DATA NETWORK OR
NETWORK SLICE THAT IS SUBJECT TO SECONDARY OR SLICE-SPECIFIC
ACCESS CONTROL
370

RESPONSIVE TO THE REQUEST, TRANSMITTING TO THE NETWORK
EQUIPMENT A RESPONSE THAT INCLUDES AT LEAST SOME OF THE STORED
SUBSCRIPTION DATA
380

IF THE SUBSCRIPTION DATA INCLUDED IN THE RESPONSE INDICATES
THE WIRELESS DEVICE IS SUBSCRIBED TO USE A CERTAIN DATA
NETWORK OR NETWORK SLICE THAT IS SUBJECT TO SECONDARY OR
SLICE-SPECIFIC ACCESS CONTROL, THE SUBSCRIPTION DATA INCLUDED
IN THE RESPONSE INCLUDES AT LEAST ONE GENERIC SUBSCRIPTION
IDENTIFIER FOR THE WIRELESS DEVICE
390

*FIGURE 3B*

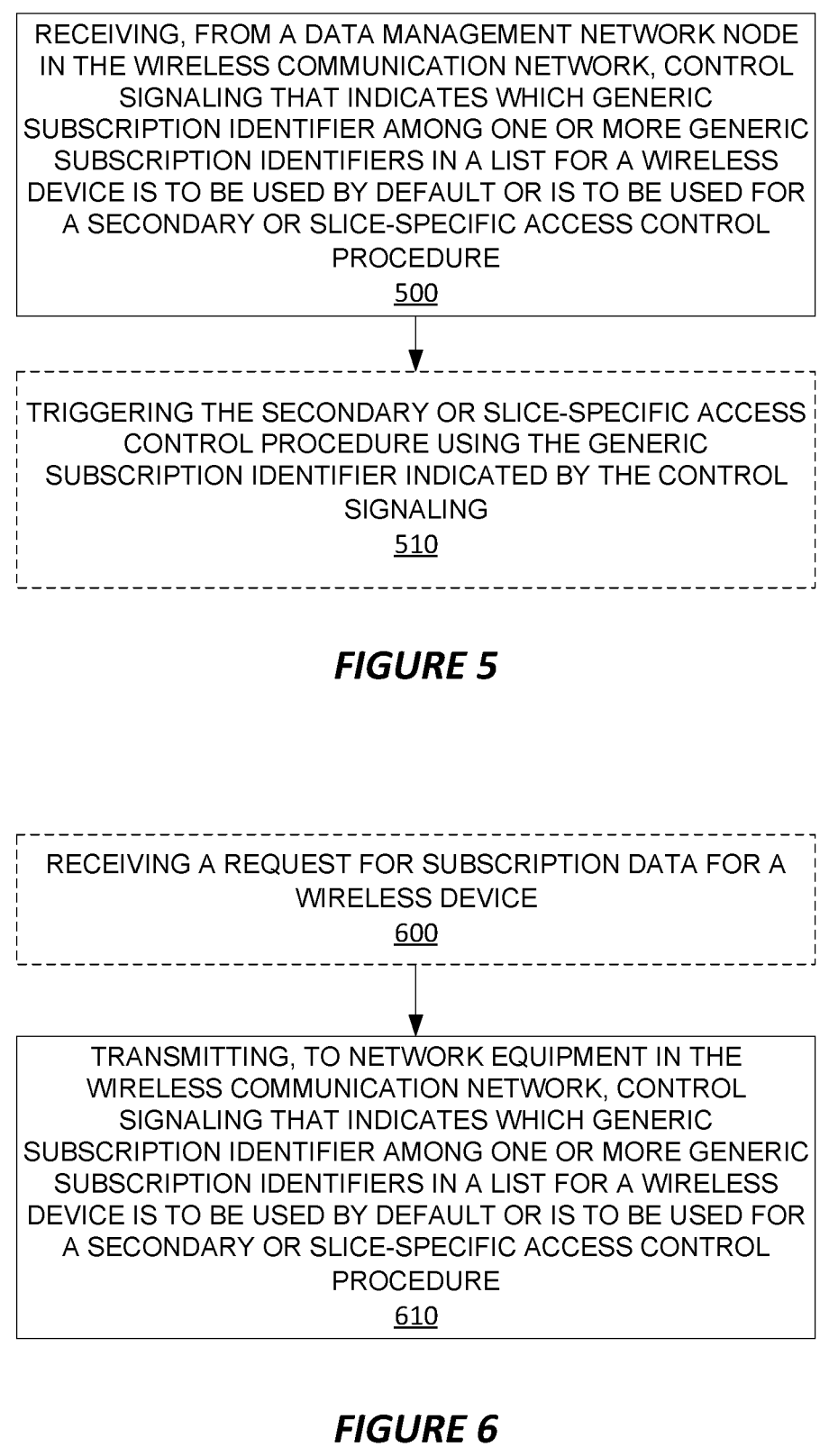

RECEIVING, FROM A DATA MANAGEMENT NETWORK NODE IN THE WIRELESS COMMUNICATION NETWORK, CONTROL SIGNALING THAT INDICATES WHICH GENERIC SUBSCRIPTION IDENTIFIER AMONG ONE OR MORE GENERIC SUBSCRIPTION IDENTIFIERS IN A LIST FOR A WIRELESS DEVICE IS TO BE USED BY DEFAULT OR IS TO BE USED FOR A SECONDARY OR SLICE-SPECIFIC ACCESS CONTROL PROCEDURE
500

TRIGGERING THE SECONDARY OR SLICE-SPECIFIC ACCESS CONTROL PROCEDURE USING THE GENERIC SUBSCRIPTION IDENTIFIER INDICATED BY THE CONTROL SIGNALING
510

*FIGURE 5*

RECEIVING A REQUEST FOR SUBSCRIPTION DATA FOR A WIRELESS DEVICE
600

TRANSMITTING, TO NETWORK EQUIPMENT IN THE WIRELESS COMMUNICATION NETWORK, CONTROL SIGNALING THAT INDICATES WHICH GENERIC SUBSCRIPTION IDENTIFIER AMONG ONE OR MORE GENERIC SUBSCRIPTION IDENTIFIERS IN A LIST FOR A WIRELESS DEVICE IS TO BE USED BY DEFAULT OR IS TO BE USED FOR A SECONDARY OR SLICE-SPECIFIC ACCESS CONTROL PROCEDURE
610

*FIGURE 6*

SECONDARY OR SPLICE-SPECIFIC ACCESS CONTROL IN A WIRELESS COMMUNICATION NETWORK

TECHNICAL FIELD

The present application relates generally to a wireless communication network, and relates more particularly to secondary or slice-specific access control in such a network.

BACKGROUND

A wireless communication network conventionally implements its own access control mechanisms in order to control a user equipment's access to the network as a whole. These "primary" access control mechanisms are typically based on credentials that are pre-provisioned by the network operator and that are securely stored with the user equipment. Support for access control mechanisms that are "secondary" to the network's own "primary" access control mechanisms, or that are specific to certain network slices, would enable the wireless communication network to support a variety of possible use cases. For example, support for secondary access control mechanisms implemented by an external data network would allow factory owners or enterprises to leverage their own identity and credential management systems for authentication and access network security.

SUMMARY

Some embodiments herein provide efficient ways for a wireless communication network to support secondary or slice-specific access control of a wireless device. According to some embodiments, for example, network equipment in the wireless communication network selectively triggers a procedure for secondary or slice-specific access control of a wireless device, depending on whether the device's subscription data includes a generic subscription identifier (e.g., a Generic Public Subscription Identifier, GPSI) for the wireless device. In other embodiments, a data management network node selectively indicates to the network equipment that the wireless device is or is not subscribed to use a certain data network or network slice, depending respectively on whether or not the subscription data stored for the device includes a generic subscription identifier. Any of these embodiments may efficiently prevent invocation of a procedure for secondary or slice-specific access control when the lack of a generic subscription identifier for the device would or should cause the procedure to fail anyway and/or would prevent an external network or server from being able to initiate a procedure to re-authenticate or re-authorize the wireless device. Alternatively or additionally, some embodiments herein mitigate ambiguity that would otherwise occur in the case that multiple generic subscription identifiers are included in the subscription data for a wireless device. According to such embodiments, a data management network node signals which generic subscription identifier is to be used by default or is to be used for a secondary or slice-specific access control procedure.

More particularly, embodiments herein include a method performed by a data management network node in a wireless communication network. The method comprises storing subscription data for a wireless device. The method further comprises receiving, from network equipment, a request that requests subscription data for the wireless device. The method also comprises, responsive to the request, transmitting to the network equipment a response that includes at least some of the stored subscription data. If the subscription data included in the response indicates the wireless device is subscribed to use a certain data network or network slice that is subject to secondary or slice-specific access control, the subscription data included in the response includes at least one generic subscription identifier for the wireless device. Here, a generic subscription identifier generically addresses a subscription to the wireless communication network in different data networks outside the wireless communication network.

In some embodiments, the method further comprises checking whether the stored subscription data indicates the wireless device is subscribed to use a certain data network or network slice that is subject to secondary or slice-specific access control. If the subscription data included in the response indicates the wireless device is subscribed to use the certain data network or network slice that is subject to secondary or slice-specific access control according to said checking, the subscription data included in the response includes at least one generic subscription identifier for the wireless device.

In some embodiments, the certain data network or network slice comprises a certain network slice, the secondary or slice-specific access control comprises slice-specific authentication and/or authorization, and the stored subscription data includes Single Network Slice Selection Assistance Information, S-NSSAI, that identifies the certain network slice. In one such embodiment, if the subscription data included in the response includes S-NSSAI identifying a certain network slice that is subject to slice-specific authentication and/or authorization, the subscription data included in the response also includes at least one generic subscription identifier for the wireless device. Alternatively or additionally, in some embodiments, the response includes or does not include the S-NSSAI which identifies the certain network slice, depending respectively on whether or not the stored subscription data includes a generic subscription identifier for the wireless device.

In some embodiments, the network equipment implements an access and mobility function, AMF.

In some embodiments, the certain data network or network slice comprises a certain data network, the secondary or slice-specific access control comprises secondary authentication and/or authorization, and the stored subscription data includes a Data Network Name, DNN, which identifies the certain data network. In one such embodiment, the subscription data included in the response includes a DNN identifying a certain data network that is subject to secondary authentication and/or authorization, the subscription data included in the response also includes at least one generic subscription identifier for the wireless device. Alternatively or additionally, the response includes or does not include the DNN which identifies the certain data network that is subject to secondary authentication and/or authorization, depending respectively on whether or not the stored subscription data includes a generic subscription identifier for the wireless device.

In some embodiments, the network equipment implements a session management function, SMF.

In some embodiments, the generic subscription identifier is a Generic Public Subscription Identifier, GPSI.

In some embodiments, the data management network node implements a Unified Data Management, UDM, function or a User Data Repository, UDR.

Embodiments herein also include a method performed by network equipment in a wireless communication network. The method comprises obtaining subscription data for a wireless device. The method also comprises triggering, or refraining from triggering, a procedure for secondary or slice-specific access control of the wireless device, depending respectively on whether or not the obtained subscription data includes a generic subscription identifier for the wireless device. Here, the generic subscription identifier generically addresses a subscription to the wireless communication network in different data networks outside the wireless communication network.

In some embodiments, the subscription data includes Single Network Slice Selection Assistance Information, S-NSSAI, that identifies a network slice to which the wireless device is subscribed and which is subject to network slice-specific access control, and the network slice-specific access control comprises network slice-specific authentication and/or authorization. In one such embodiment, said triggering or refraining from triggering comprises triggering, or refraining from triggering, a procedure for the network slice-specific authentication and/or authorization of the wireless device with respect to the network slice, depending respectively on whether or not the obtained subscription data includes a generic subscription identifier for the wireless device. In one embodiment, the network equipment implements an access and mobility function, AMF. Alternatively or additionally, in some embodiments, the subscription data is obtained as part of, or during, a procedure for registering the wireless device with the wireless communication network, the subscription data is obtained after or in response to receiving a request to register the wireless device, and the method further comprises, after or based on refraining from triggering the procedure for network slice-specific authentication and/or authorization, either rejecting the request or transmitting control signaling towards the wireless device that excludes the S-NSSAI from a list of one or more S-NSSAIs identifying one or more respective network slices that the wireless device is allowed to use.

In other embodiments, the subscription data includes a Data Network Name, DNN, that identifies a data network to which the wireless device is subscribed and which is subject to secondary access control, said secondary access control comprises secondary authentication and/or authorization, and said triggering or refraining from triggering comprises triggering, or refraining from triggering, a procedure for the secondary authentication and/or authorization of the wireless device with respect to the data network, depending respectively on whether or not the obtained subscription data includes a generic subscription identifier for the wireless device. In one such embodiment, the subscription data is obtained as part of, or during, a procedure for establishing a session between the wireless device and the data network, the subscription data is obtained after or in response to receiving a request to establish the session, and the method further comprises, after or based on refraining from triggering the procedure for the secondary authentication and/or authorization, rejecting the received request.

In some embodiments, the network equipment implements a session management function, SMF.

In some embodiments, the generic subscription identifier is a Generic Public Subscription Identifier, GPSI.

Embodiments herein further include corresponding apparatus, computer programs, and carriers of those computer programs. For example, embodiments herein include a data management network node in a wireless communication network. The data management network node comprises communication circuitry and processing circuitry. The processing circuitry is configured to store subscription data for a wireless device. The processing circuitry is further configured to receive, from network equipment, a request that requests subscription data for the wireless device. The processing circuitry may also be configured to, responsive to the request, transmit to the network equipment a response that includes at least some of the stored subscription data. If the subscription data included in the response indicates the wireless device is subscribed to use a certain data network or network slice that is subject to secondary or slice-specific access control, the subscription data included in the response includes at least one generic subscription identifier for the wireless device. Here, a generic subscription identifier generically addresses a subscription to the wireless communication network in different data networks outside the wireless communication network.

Embodiments further include network equipment configured for use in a wireless communication network. The network equipment comprises communication circuitry and processing circuitry. The processing circuitry is configured to obtain subscription data for a wireless device. The processing circuitry is also configured to trigger, or refrain from triggering, a procedure for secondary or slice-specific access control of the wireless device, depending respectively on whether or not the obtained subscription data includes a generic subscription identifier for the wireless device. Here, the generic subscription identifier generically addresses a subscription to the wireless communication network in different data networks outside the wireless communication network.

Of course, the present disclosure is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 2 is a logic flow diagram of a method performed by network equipment in a wireless communication network according to some embodiments.

FIG. 3A is a logic flow diagram of a method performed by a data management network node in a wireless communication network according to some embodiments.

FIG. 3B is a logic flow diagram of a method performed by a data management network node in a wireless communication network according to other embodiments.

FIG. 5 is a logic flow diagram of a method performed by network equipment in a wireless communication network according to other embodiments.

FIG. 6 is a logic flow diagram of a method performed by a data management network node in a wireless communication network according to other embodiments.

DETAILED DESCRIPTION

Figure 1:
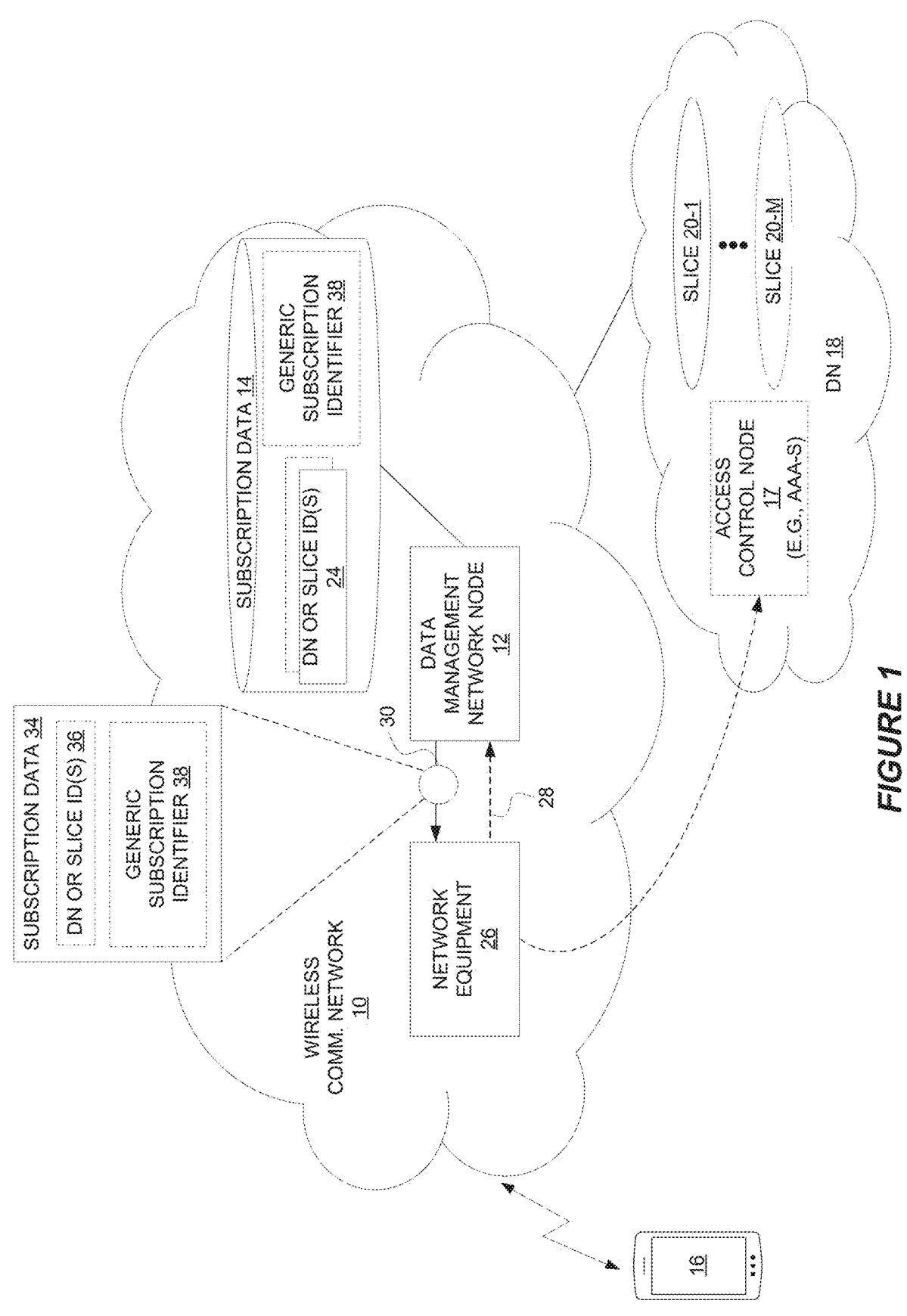
FIG. 1 is a block diagram of a wireless communication network according to some embodiments.

FIG. 1 shows a wireless communication network 10 according to some embodiments, e.g., a 5G network. The wireless communication network 10 includes a data management network node 12, e.g., implementing a Unified Data Management (UDM) function or a User Data Repository (UPR). The data management network node 12 is configured to store subscription data 14 for a wireless device 16. The subscription data 14 may include data about one or more subscriptions associated with or used by the wireless device 16.

The one or more subscriptions may include for instance a subscription to communication services provided by the wireless communication network 10, which may for instance be a home network of the wireless device 16. Such subscription may be identified for instance by an International Mobile Subscriber Identity (IMSI) provisioned by an operator of the wireless communication network 10 and securely stored on tamper-resistant hardware of the wireless device 16. In some embodiments, the wireless communication network 10 itself implements access control mechanisms to authenticate and/or authorize the wireless device 16 with respect to the wireless communication network 10. Such access control by the wireless communication network 10 may be referred to as "primary" access control, which may include primary authentication of and/or primary authorization of the wireless device 16. In a 5G network, such primary access control may involve for instance the wireless device 16 transmitting credentials towards an authentication server function (AUSF) in the wireless communication network 10 and the AUSF determining whether those credentials are valid for receiving the requested service.

The one or more subscriptions in some embodiments may also include a subscription to a data network (DN) 18, e.g., that provides network operator services, Internet access, or 3$^{rd}$ party services. In some embodiments, the DN 18 is the same as or different than the wireless communication network 10. Alternatively or additionally, the DN 18 may be internal or external to (i.e., inside of or outside of) the wireless communication network 10. The DN 18 may be a serving or visited network of the wireless device 16. In some embodiments, the wireless communication network 10 delegates, to the DN 18 itself, implementation of procedures for controlling access to the DN 18, e.g., via an Extensible Authentication Protocol (EAP). Secondary access control to the DN 18 may include secondary authentication and/or authorization of the wireless device 16. FIG. 1 shows as an example that secondary access control to the DN 18 may be controlled, implemented, or otherwise handled by an access control node 17 in the DN 18, e.g., an Authentication, Authorization, and Accounting (AAA) Server (AAA-S) in the DN 18. Regardless, access control to the DN 18 may be secondary in nature, e.g., in the sense that it is access control which occurs in addition to primary access control to the wireless communication network 10. In some embodiments, for instance, secondary access control is triggered after primary access control. For example, in some embodiments, secondary access control to the DN 18 is triggered as part of, or during, establishment of a session between the wireless device 16 and the DN 18.

The one or more subscriptions in other embodiments may alternatively or additionally include a subscription to a network slice, e.g., in the DN 18 as shown. A network slice is a logical network that provides specific network capabilities and network characteristics. An operator can deploy multiple network slices to provide different logical networks for providing different respective network capabilities and network characteristics. For example, different network slices 20-1 ... 20-M may be dedicated to different respective services, such as Internet of Things (IoT) services, mission-critical services, mobile broadband services, etc. The network slices 20-1 ... 20-M may accordingly have respective slice-specific nodes or functions dedicated to serving those slices. In some 5G embodiments, for example, each network slice may include a slice-specific Access and Mobility Function (AMF), Session Management Function (SMF), and/or User Plane Function (UPF). Regardless, in some embodiments, the wireless communication network 10 delegates, to the DN 18 or a specific network slice, implementation of procedures for controlling access to the network slice. FIG. 1 shows as an example that access control to a network slice may be controlled, implemented, or otherwise handled by an access control node 17 in the DN 18, e.g., an Authentication, Authorization, and Accounting (AAA) Server (AAA-S) in the DN 18. Regardless, access control to the network slice may be slice-specific in nature. Slice-specific access control may include slice-specific authentication and/or authorization of the wireless device 16. In some embodiments, slice-specific access control is triggered during registration of the wireless device 16 with the wireless communication network 10 and/or the DN 18.

The subscription data 14 stored by the data management network node 12 may correspondingly indicate to which data network(s) and/or network slice(s) the wireless device 16 is subscribed. As shown, for instance, the subscription data 14 may include one or more identifiers (IDs) 24 that identify one or more data networks and/or one or more network slices to which the wireless device 16 is subscribed. The one or more IDs 24 may for instance take the form of a Data Network Name (DNN) to identify a data network to which the wireless device 16 is subscribed. Alternatively or additionally, the one or more IDs 24 may take the form of Single Network Slice Selection Assistance Information (S-NSSAI) to identify a network slice to which the wireless device 16 is subscribed.

In some embodiments, network equipment 26 (e.g., implementing an AMF or SMF) in the wireless communication network 10 is configured to obtain at least some of the subscription data 14 for the wireless device 16, e.g., by receiving at least some of that subscription data 14. The network equipment 26 may for instance send to the data management network node 12 a request 28 that requests subscription data for the wireless device 16, and receive a response 30 that includes subscription data 34, which may comprise all or part of the subscription data 14 stored at or by the data management network node 12. The subscription data 34 may be obtained for instance as part of, or during, a procedure for establishing a session between the wireless device 16 and the DN 18. In this case, the network node 26 may obtain the subscription data 34 after or in response to receiving a request to establish the session. Alternatively or additionally, the subscription data 34 may be obtained as part of, or during, a procedure for registering the wireless device 16 with the wireless communication network 10 and/or a network slice. In this case, the subscription data 34 may be obtained after or in response to receiving a request to register the wireless device 16.

If the obtained subscription data 34 indicates that the wireless device 16 is subscribed to a DN or network slice which is subject to secondary or slice-specific access control, a procedure for such secondary or slice-specific access control is required in order for the wireless device 16 to access that DN or network slice. Heretofore, then, such procedure for secondary or slice-specific access control would be unconditionally triggered responsive to the obtained subscription data 34 indicating that the wireless device 16 is subscribed to a DN or network slice which is subject to secondary or slice-specific access control. According to some embodiments, by contrast, the network equipment 26 herein selectively triggers a procedure for secondary or slice-specific access control of the wireless device 16, depending on whether the obtained subscription data 34 includes a generic subscription identifier 38 for the wireless device 16. For example, the network equipment 26 may trigger, or refrain from triggering, a procedure for secondary or slice-specific access control of the wireless device 16, depending respectively on whether or not the obtained subscription data 34 includes a generic subscription identifier 38 for the wireless device 16. In this case, then, the network equipment 26 checks whether the obtained subscription information 34 includes a generic subscription identifier 38 for the wireless device 16, and either triggers the procedure for secondary or slice-specific access control if the check reveals the obtained subscription information 34 includes a generic subscription identifier 38 for the wireless device 16 or refrains from triggering the procedure for secondary or slice-specific access control if the check reveals the obtained subscription information 34 does not include a generic subscription identifier 38 for the wireless device 16.

A generic subscription identifier 38 as used herein generically addresses a subscription to the wireless communication network 10 in different data networks (e.g., DN 18) outside the wireless communication network 10. That is, the wireless device's subscription to the wireless communication network 10 may be addressed or otherwise referenced even by or in different data networks outside of the wireless communication network 10, due to the generic nature of the subscription identifier 38. One example of such a generic subscription identifier 38 is a Generic Public Subscription Identifier (GPSI) in a 3rd Generation Partnership Project (3GPP) network, which addresses a 3GPP subscription in different networks outside of the 3GPP system and which may be either an MSISDN or an External Identifier (e.g., of the form username@realm). In these and other embodiments, the wireless device 16 may or may not be assigned or provisioned with a generic subscription identifier 38, e.g., depending on provisioning implementation.

If the obtained subscription data 34 lacks a generic subscription identifier 38 for the wireless device 16, the wireless device's subscription to the wireless communication network 10 will not be addressable or referenceable outside of the wireless communication network 10, e.g., by the DN 18 or a network slice in the DN 18 where the DN 18 is outside of the wireless communication network 10. Some embodiments herein therefore recognize or consider that a procedure for secondary or slice-specific access control of the wireless device 16 will or should fail if the obtained subscription data 34 lacks a generic subscription identifier 38 for the wireless device 16. According to some embodiments herein, then, by triggering the procedure for secondary or slice-specific access control only when the subscription information 34 includes a generic subscription identifier for the wireless device 16, the network equipment 26 efficiently prevents invocation of the procedure for secondary or slice-specific access control when the lack of a generic subscription identifier for the device 16 would or should cause the procedure to fail anyway and/or would prevent an external network or server from being able to initiate a procedure to re-authenticate or re-authorize the wireless device 16.

In these and other embodiments, the network equipment 26 refraining from triggering the procedure for secondary or slice-specific access control may prompt or be performed as part of rejecting a request from the wireless device 16, e.g., a request to establish a session with the DN 18 or a request to register the wireless device 16. For example, the network equipment 26 may obtain the subscription data 34 after or in response to receiving a request to establish a session with the DN 18 or to register the wireless device 16. Then, after or based on refraining from triggering the procedure for secondary or slice-specific access control, the network equipment 26 may reject the request. Alternatively or additionally, the network equipment 26 refraining from triggering the procedure for secondary or slice-specific access control may prompt or be performed as part of transmitting control signaling towards the wireless device 16 that indicates the wireless device 16 is not allowed to use the DN or network slice for which access control was not performed. Such may involve the network equipment 26 transmitting control signaling towards the wireless device 16 that excludes the ID for that DN or slice from a list of one or more DN or slice IDs identifying one or more DNs or slices that the wireless device 16 is allowed to use.

Consider an example for Network Slice-Specific Authentication and Authorization (NSSAA) in a 5G network. In this case, the Network Slice-Specific Authentication and Authorization procedure is triggered for an S-NSSAI requiring Network Slice-Specific Authentication and Authorization with an AAA Server (AAA-S) which may be hosted by the H-PLMN operator or by a third party which has a business relationship with the H-PLMN, using the EAP framework as described in 3GPP TS 33.501 v16.2.0. An AAA Proxy (AAA-P) in the HPLMN may be involved, e.g., if the AAA Server belongs to a third party.

This procedure is triggered by the AMF during a Registration procedure when some Network Slices require Slice-Specific Authentication and Authorization, when AMF determines that Network Slice-Specific Authentication and Authorization is required for an S-NSSAI in the current Allowed NSSAI (e.g. subscription change), or when the AAA Server that authenticated the Network Slice triggers a re-authentication.

The AMF performs the role of the EAP Authenticator and communicates with the AAA-S via the AUSF. The AUSF undertakes any AAA protocol interworking with the AAA protocol supported by the AAA-S.

In some embodiments, the Network Slice-Specific Authentication and Authorization procedure herein requires the use of a GPSI. In some embodiments, where the network equipment 26 corresponds to the AMF, if the subscription information received by the AMF includes S-NSSAIs subject to Network Slice-Specific Authentication and Authorization but no GPSI for the UE is provided by the UDM, the AMF shall not initiate the Network Slice-Specific Authentication and Authorization procedure for the corresponding S-NSSAIs and/or shall not include them in the list of allowed S-NSSAIs provided to the UE.

As another example for Secondary Authentication, the PDU Session establishment authentication/authorization procedure herein requires the use of a GPSI according to some embodiments. Where the network equipment 26 corresponds to the SMF, if the subscription information received by the SMF includes DNNs subject to secondary authentication but no GPSI for the UE is provided by the UDM, the SMF shall reject the establishment of the PDU session according to some embodiments.

In view of the above modifications and variations, FIG. 2 depicts a method performed by network equipment 26 in a wireless communication network 10 in accordance with particular embodiments. The method includes obtaining subscription data 34 for a wireless device 16 (Block 200). The method also includes triggering, or refraining from triggering, a procedure for secondary or slice-specific access control of the wireless device 16, depending respectively on whether or not the obtained subscription data 34 includes a generic subscription identifier 38 for the wireless device 16 (Block 210). Here, the generic subscription identifier 38 generically addresses a subscription to the wireless communication network 10 in different data networks outside the wireless communication network 10.

In some embodiments, the method further comprises receiving a request to establish a session or to register the wireless device 16 (Block 205). In one or more such embodiments, after or based on refraining from triggering the procedure for secondary or slice-specific access control, the method may include rejecting the received request (Block 220).

Returning back to FIG. 1, alternatively or additionally to embodiments above, the data management network node 12 may selectively indicate to the network equipment 26 that the wireless device 16 is or is not subscribed to use a certain data network or network slice (e.g., one that is subject to secondary or slice-specific access control), depending respectively on whether or not the subscription data 14 stored for the device 16 includes a generic subscription identifier 38. That is, even if the stored subscription data 14 indicates the wireless device is subscribed to use a certain data network or network slice (e.g., which is subject to secondary or slice-specific access control), the data management network node 12 may nonetheless only indicate to the network equipment 26 that the wireless device 16 is subscribed to use the certain data network or network slice if the stored subscription data 14 includes a generic subscription identifier 38 for the wireless device. By effectively withholding subscription data for any data network or network slice, to which the wireless device 16 is subscribed and which is subject to secondary or slice-specific access control, when the stored subscription data 14 lacks a generic subscription identifier 38 for the wireless device 38, these embodiments may have a similar effect as those described above; namely, the embodiments may efficiently prevent invocation of a procedure for secondary or slice-specific access control when the lack of a generic subscription identifier for the device 16 would or should cause the procedure to fail anyway and/or would prevent an external network or server from being able to initiate a procedure to re-authenticate or re-authorize the wireless device 16. Indeed, without indicating that the wireless device 16 is even subscribed to use a data network or network slice which is subject to secondary or slice-specific access control, no such procedure will ever be triggered.

Consider an example for Network Slice-Specific Authentication and Authorization (NSSAA) in a 5G network. In some embodiments, the Network Slice-Specific Authentication and Authorization procedure requires the use of a GPSI. Where the data management network node 12 corresponds to the UDM, if the UDM provides S-NSSAIs subject to Network Slice-Specific Authentication and Authorization to the AMF, then the UDM shall also provide at least one GPSI according to some embodiments. If there is no GPSI included in the subscription data, then the UDM shall not provide S-NSSAIs subject to Network Slice-Specific Authentication and Authorization to the AMF.

As another example for Secondary Authentication, the PDU Session establishment authentication/authorization procedure requires the use of a GPSI according to some embodiments. Where the data management network node 12 corresponds to the UDM, if the subscription information includes DNNs subject to secondary authentication but no GPSI for the UE, then the UDM shall not provide the subscription information for the DNN subject to secondary authentication to the AMF or SMF, and instead the UDM may provide default DNN, if that DNN is not subject to secondary authentication.

FIG. 3A correspondingly depicts a method performed by a data management network node 12 in a wireless communication network 10 in accordance with other particular embodiments. The method includes storing subscription data 14 for a wireless device 16 (Block 300). The stored subscription data 14 indicates the wireless device 16 is subscribed to use a certain data network or network slice. The certain data network or network slice is subject to secondary or slice-specific access control. The method also includes receiving, from network equipment 26, a request 28 that requests subscription data for the wireless device 16 (Block 310). The method further comprises, responsive to the request 28, transmitting to the network equipment 26 a response 30 that includes at least some of the stored subscription data 14 (Block 320). In particular, the response 30 indicates or does not indicate the wireless device 16 is subscribed to use the certain data network or network slice, depending respectively on whether or not the stored subscription data 14 includes a generic subscription identifier 38 for the wireless device 16. For example, the response 30 includes or does not include a ID for the certain data network or network slice, depending respectively on whether or not the stored subscription data 14 includes a generic subscription identifier 38 for the wireless device 16. Here, the generic subscription identifier 38 generically addresses a subscription to the wireless communication network 10 in different data networks outside the wireless communication network 10.

FIG. 3B depicts a method performed by a data management network node 12 in a wireless communication network 10 in accordance with yet other embodiments. The method includes storing subscription data 14 for a wireless device 16 (Block 350). The method also includes receiving, from network equipment 26, a request 28 that requests subscription data for the wireless device 16 (Block 360). The method further comprises, responsive to the request 28, transmitting to the network equipment 26 a response 30 that includes at least some of the stored subscription data 14 (Block 380). In some embodiments, if the subscription data included in the response 30 indicates the wireless device 16 is subscribed to use a certain data network or network slice that is subject to secondary or slice-specific access control, the subscription data included in the response 30 includes at least one generic subscription identifier 38 for the wireless device 16 (Block 390). Here, the generic subscription identifier 38 generically addresses a subscription to the wireless communication network 10 in different data networks outside the wireless communication network 10.

For example, the data management network node 12 in some embodiments, checks whether the stored subscription data indicates the wireless device 16 is subscribed to use a certain data network or network slice that is subject to secondary or slice-specific access control (Block 370). If so, then the data management network node 12 ensures that the subscription data included in the response 30 includes at least one generic subscription identifier 38 for the wireless device 16, e.g., as part of enforcing or complying with a requirement that the provided subscription data must include at least one generic subscription identifier 38 for the wireless device 16 if the provided subscription data indicates the wireless device 16 is subscribed to use a certain data network or network slice that is subject to secondary or slice-specific access control. Ensuring that the subscription data included in the response 30 includes at least one generic subscription identifier 38 for the wireless device 16 in this case may advantageously ensure the procedure for secondary or slice-specific access control will not fail for lack of a generic subscription identifier 38 for the device 16.

In fact, in some embodiments, the data management network node 12 generates the response 30 to include or not include an ID for the certain data network or network slice, depending respectively on whether or not the stored subscription data 14 includes a generic subscription identifier 38 for the wireless device 16. Accordingly, if the stored subscription data 14 does not include any generic subscription identifier 38 for the wireless device 16, the data management network node 12 may generate the response 30 to not include an ID for any data network or network slice that is subject to secondary or slice-specific access control.

Figure 4:
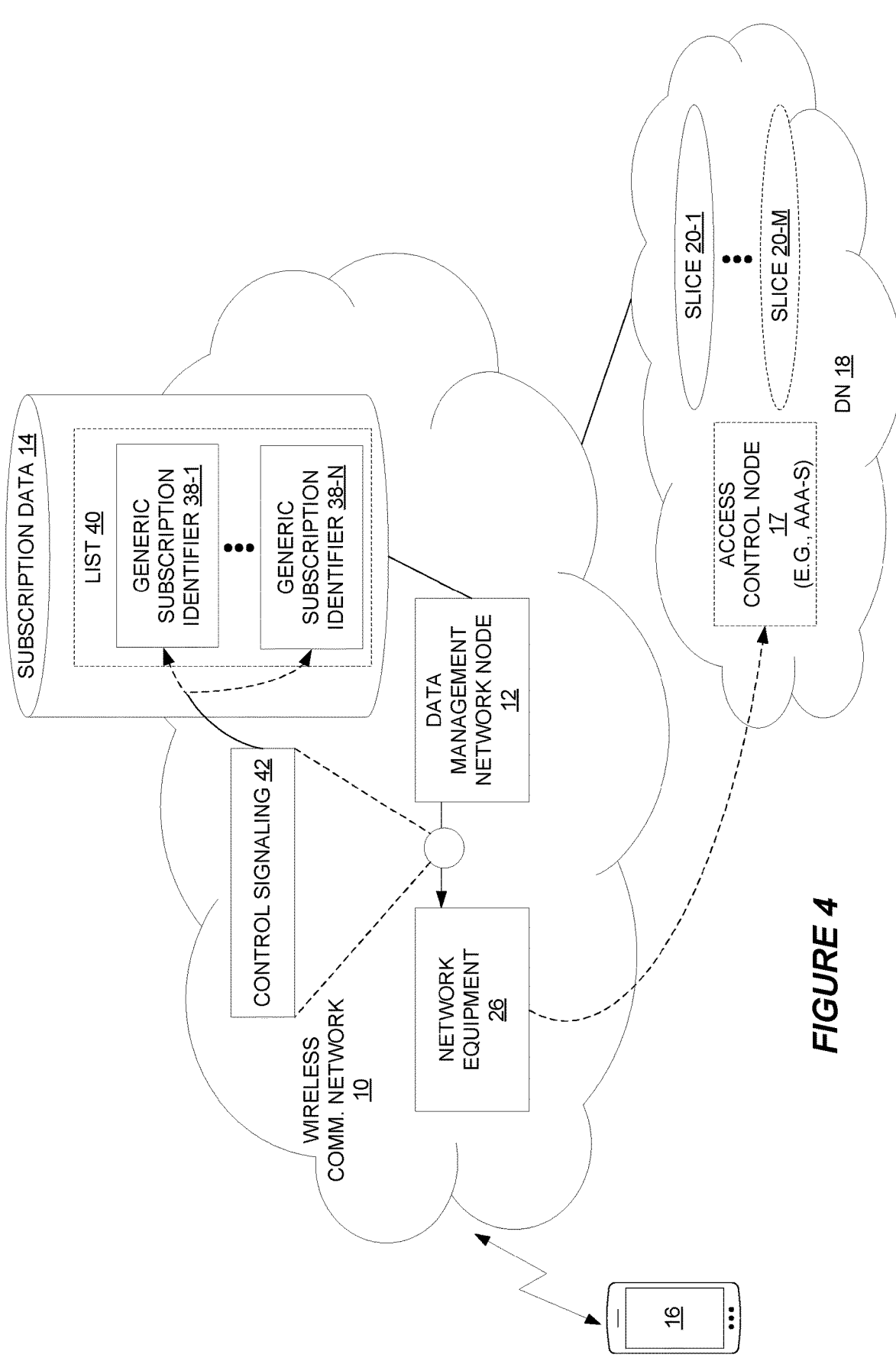
FIG. 4 is a block diagram of a wireless communication network according to other embodiments.

Yet other embodiments herein mitigate ambiguity that would otherwise occur in the case that multiple generic subscription identifiers are included in the subscription data for a wireless device. FIG. 4 for example shows that in some embodiments the stored subscription data 14 includes one or more generic subscription identifiers 38-1 . . . 38-N for the wireless device 16, e.g., in a list 40, where N>=1. In one or more such embodiments, the data management network node 12 may transmit control signaling 42 to the network equipment 26. This control signaling 42 as shown indicates which generic subscription identifier among the one or more generic subscription identifiers 38-1 . . . 38-N is to be used by default or is to be used for a secondary or slice-specific access control procedure. This way, the network equipment 26 may know which generic subscription identifier to use in the secondary or slice-specific access control procedure.

In some embodiments, for example, the control signaling 42 includes the list 40, with an ordering of the one or more generic subscription identifiers 38-1 . . . 38-N indicating which generic subscription identifier among the one or more generic subscription identifiers 38-1 . . . 38-N in the list 42 is to be used by default. For example, in some embodiments, the first generic subscription identifier in the list 42 is to be used by default. In other embodiments, the control signaling 42 includes an information element that explicitly indicates which generic subscription identifier among one or more generic subscription identifiers 38-1 . . . 38-N in the list 42 for the wireless device 16 is to be used by default.

In yet other embodiments, the control signaling 42 includes an information element that explicitly indicates which generic subscription identifier among one or more generic subscription identifiers 38-1 . . . 38-N in the list 42 for the wireless device 16 is to be used for the secondary or slice-specific access control procedure.

Consider an example where the network equipment 26 is an AMF or SMF and the data management network node 12 implements a UDM in a 5G network. In this case, the AMF or SMF may receive from the UDM subscription information for a wireless device (e.g., a UE) including a list of GPSIs.

In one embodiment that exploits a default or basic GPSI, one of the GPSIs in the list provided by the UDM is used as Default/Basic GPSI and this is used for the Network Slice Selection Authentication and Authorization (NSSAA) in the AMF and/or Secondary authentication procedures in SMF. Different options can be used to indicate which is the Default/Basic GPSI. In one option, referred to as Option a.1, the Default/Basic GPSI may be explicitly marked as Default/Basic (i.e. a new indication or explicit signaling of the "Default/Basic GPSI" will be required to be specified). The new indication may be associated to the "Default/Basic GPSI" and may be included in data and signaling when the "Default/Basic GPSI" is stored or signaled (e.g. in UDR, UDM and AMF/SMF). Alternatively, in a simpler way, referred to as Option a.2, the first GPSI in the list provided by the UDM shall be considered as the Default/Basic GPSI.

In another embodiment that exploits a specific GPSI for NSSAA or Secondary Authentication, the UDM indicates explicitly which GPSI is to be used for NSSAA or Secondary Authentication procedures. This may be referred to as Option b. This may be done specifying a new indication for NSSAA or Secondary authentication in the list of GPSIs or specifying a NSSAA GPSI in the Slice Selection Subscription data provided to the AMF (either one GPSI common to all S-NSSAIs subject to NSSAA or one GPSI for each S-NSSAI subject to NSSAA) and a GPSI per DNN subject to Secondary authentication in the SMF subscription data provided to the SMF.

In some embodiments, the same GPSI is used in NSSAA and secondary authentication procedures. In other embodiments, different GPSIs are used for NSSAA and secondary authentication.

In some embodiments, different GPSIs are used for NSSAA or Secondary authentication per slice or DNN.

The following changes to table 5.2.3.3.1-1 in 3GPP TS 23.502 v16.4.0 (2020-03) may be used to support the above options.

TABLE 5.2.3.3.1-1

UE Subscription data types

| Subscription data type | Field | Description |
|---|---|---|
| Access and Mobility Subscription data (data needed for UE Registration and Mobility Management) | GPSI List | List of the GPSI (Generic Public Subscription Identifier) used both inside and outside of the 3GPP system to address a 3GPP subscription. Option a.1) one of the GPSIs in the list includes indication that "IsDefault/Basic". Option a.2) First GPSI in the list is considered as Default/Basic GPSI. |
| | Option a.1) Default/Basic GPSI | Default/Basic GPSI to be used e.g. in NSSAA procedures when multiple GPSIs are included in the GPSI list. |
| | Internal Group ID-list | List of the subscribed internal group(s) that the UE belongs to. |
| | Subscribed-UE-AMBR | The Maximum Aggregated uplink and downlink MBRs to be shared across all Non-GBR QoS Flows according to the subscription of the user. |
| | Subscribed S-NSSAIs | The Network Slices that the UE subscribes to. In the roaming case, it indicates the subscribed Network Slices applicable to the Serving PLMN. |
| | Default S-NSSAIs | The Subscribed S-NSSAIs marked as default S-NSSAI. In the roaming case, only those applicable to the Serving PLMN. |
| | S-NSSAIs subject to Network Slice-Specific Authentication and Authorization | The Subscribed S-NSSAIs marked as subject to NSSAA. Option b) GPSI to be used for the S-NSSAIs or GPSI per S-NSSAI. |
| | UE Usage Type | As defined in TS 23.501 [2], clause 5.15.7.2. |
| | RAT restriction | 3GPP Radio Access Technology(ies) not allowed the UE to access. |
| | Forbidden area | Defines areas in which the UE is not permitted to initiate any communication with the network. |
| | Service Area Restriction | Indicates Allowed areas in which the UE is permitted to initiate communication with the network, and Non-allowed areas in which the UE and the network are not allowed to initiate Service Request or SM signalling to obtain user services. |
| | Core Network type restriction | Defines whether UE is allowed to connect to 5GC and/or EPC for this PLMN. |
| | CAG information | The CAG information includes Allowed CAG list and, optionally an indication whether the UE is only allowed to access 5GS via CAG cells as defined in TS 23.501 [2], clause 5.30.3. |
| | CAG information Subscription Change Indication | When present, indicates to the serving AMF that the CAG information in the subscription data changed and the UE must be updated. |
| | RFSP Index | An index to specific RRM configuration in the NG-RAN. |
| | Subscribed Periodic Registration Timer | Indicates a subscribed Periodic Registration Timer value. |
| | MPS priority | Indicates the user is subscribed to MPS as indicated in TS 23.501 [2], clause 5.16.5. |
| | MCX priority | Indicates the user is subscribed to MCX as indicated in TS 23.501 [2], clause 5.16.6. |
| | AMF-Associated Expected UE Behaviour parameters | Information on expected UE movement and communication characteristics. See clause 4.15.6.3 |
| | AMF-Associated Network Configuration parameters | Information on UE specific network configuration parameters and their corresponding validity times. See clause 4.15.6.3a. |
| | Steering of Roaming | List of preferred PLMN/access technology combinations or HPLMN indication that no change of the "Operator Controlled PLMN Selector with Access Technology" list stored in the UE is needed (see NOTE 3). Optionally includes an indication that the UDM requests an acknowledgement of the reception of this information from the UE. |

TABLE 5.2.3.3.1-1-continued

| Subscription data type | Field | Description |
| --- | --- | --- |
| | SoR Update Indicator for Initial Registration | An indication whether the UDM requests the AMF to retrieve SoR information when the UE performs Registration with NAS Registration Type "Initial Registration". |
| | SoR Update Indicator for Emergency Registration | An indication whether the UDM requests the AMF to retrieve SoR information when the UE performs Registration with NAS Registration Type "Emergency Registration". |
| | Network Slicing Subscription Change Indicator | When present, indicates to the serving AMF that the subscription data for network slicing changed and the UE configuration must be updated. |
| | Tracing Requirements | Trace requirements about a UE (e.g. trace reference, address of the Trace Collection Entity, etc.) is defined in TS 32.421 [39]. This information is only sent to AMF in the HPLMN or one of its equivalent PLMN(s). |
| | Inclusion of NSSAI in RRC Connection Establishment Allowed | When present, it is used to indicate that the UE is allowed to include NSSAI in the RRC connection Establishment in clear text for 3GPP access. |
| | Service Gap Time | Used to set the Service Gap timer for Service Gap Control (see TS 23.501 [2] clause 5.31.16). |
| | Subscribed DNN list | List of the subscribed DNNs for the UE (NOTE 1). Used to determine the list of LADN available to the UE as defined in clause 5.6.5 of TS 23.501 [2]. |
| | UDM Update Data | Includes a set of parameters (e.g. updated Default Configured NSSAI and/or updated Routing Indicator) to be delivered from UDM to the UE via NAS signalling as defined in clause 4.20 (NOTE 3). Optionally includes an indication that the UDM requests an acknowledgement of the reception of this information from the UE and an indication for the UE to re-register. |
| | NB-IoT UE priority | Numerical value used by the NG-RAN to prioritise between UEs accessing via NB-IoT. |
| | Enhanced Coverage Restriction | Specifies whether CE mode B is restricted for the UE, or both CE mode A and CE mode B are restricted for the UE, or both CE mode A and CE mode B are not restricted for the UE. |
| | IAB-Operation allowed | Indicates that the subscriber is allowed for IAB-operation as specified in TS 23.501 [2] clause 5.35.2. |
| | Charging Characteristics | It contains the Charging Characteristics as defined in Annex A, clause A.1 of TS 32.256 [71]. |
| | Extended idle mode DRX cycle length | Indicates a subscribed extended idle mode DRX cycle length value. |
| Slice Selection Subscription data (data needed for Slice Selection as described in clause 4.2.2.2.3 and in clause 4.11.0a.5) | Subscribed S-NSSAIs | The Network Slices that the UE subscribes to. In roaming case, it indicates the subscribed network slices applicable to the serving PLMN. |
| | Default S-NSSAIs | The Subscribed S-NSSAIs marked as default S-NSSAI. In the roaming case, only those applicable to the Serving PLMN. |
| | S-NSSAIs subject to Network Slice-Specific Authentication and Authorization | The Subscribed S-NSSAIs marked as subject to NSSAA. Option b) GPSI to be used for the S-NSSAIs or GPSI per S-NSSAI. |
| UE context in AMF data | AMF | Allocated AMF for the registered UE. Include AMF address and AMF NF Id. |
| | Access Type | 3GPP or non-3GPP access through this AMF |
| | Homogenous Support of IMS Voice over PS Sessions for AMF | Indicates per UE and AMF if "IMS Voice over PS Sessions" is homogeneously supported in all TAs in the serving AMF or homogeneously not supported, or, support is non-homogeneous/unknown, see clause 5.16.3.3 of TS 23.501 [2]. |

TABLE 5.2.3.3.1-1-continued

UE Subscription data types

| Subscription data type | Field | Description |
| --- | --- | --- |
| | URRP-AMF information | UE Reachability Request Parameter indicating that UE reachability notification from AMF has been subscribed by the UDM. The information is per UE and should be kept even when the contexts related to a specific AMF is removed. |
| SMF Selection Subscription data (data needed for SMF Selection as described in clause 6.3.2 of TS 23.501 [2]) | SUPI | Key |
| | | SMF Selection Subscription data contains one or more S-NSSAI level subscription data: |
| | S-NSSAI | Indicates the value of the S-NSSAI. |
| | Subscribed DNN list | List of the subscribed DNNs for the UE (NOTE 1). |
| | Default DNN | The default DNN if the UE does not provide a DNN (NOTE 2). |
| | LBO Roaming Information | Indicates whether LBO roaming is allowed per DNN, or per (S-NSSAI, subscribed DNN). |
| | Interworking with EPS indication list | Indicates whether EPS interworking is supported per (S-NSSAI, subscribed DNN). |
| | Same SMF for Multiple PDU Sessions to the same DNN and S-NSSAI | Indication whether the same SMF for multiple PDU Sessions to the same DNN and S-NSSAI is required. |
| | Invoke NEF indication | When present, indicates, per S-NSSAI and per DNN, that NEF based infrequent small data transfer shall be used for the PDU Session (see NOTE 8). |
| | SMF information for static IP address/prefix | When static IP address/prefix is used, this may be used to indicate the associated SMF information per (S-NSSAI, DNN). |
| UE context in SMF data | SUPI | Key. |
| | PDU Session Id(s) | List of PDU Session Id(s) for the UE. |
| | | For emergency PDU Session Id: |
| | Emergency Information | The PGW-C + SMF FQDN for emergency session used for interworking with EPC. |
| | | For each non-emergency PDU Session Id: |
| | DNN | DNN for the PDU Session. |
| | SMF | Allocated SMF for the PDU Session. Includes SMF IP Address and SMF NF Id. |
| | PGW-C + SMF FQDN | The S5/S8 PGW-C + SMF FQDN used for interworking with EPS (see NOTE 5). |
| SMS Management Subscription data (data needed by SMSF for SMSF Registration) | SMS parameters | Indicates SMS parameters subscribed for SMS service such as SMS teleservice, SMS barring list |
| | Trace Requirements | Trace requirements about a UE (e.g. trace reference, address of the Trace Collection Entity, etc.) is defined in TS 32.421 [39]. This information is only sent to a SMSF in HPLMN. |
| SMS Subscription data (data needed in AMF) | SMS Subscription | Indicates subscription to any SMS delivery service over NAS irrespective of access type. |
| UE Context in SMSF data | SMSF Information | Indicates SMSF allocated for the UE, including SMSF address and SMSF NF ID. |
| | Access Type | 3GPP or non-3GPP access through this SMSF |
| Session Management Subscription data (data needed for PDU Session Establishment) | GPSI List | List of the GPSI (Generic Public Subscription Identifier) used both inside and outside of the 3GPP system to address a 3GPP subscription. Option a.1) one of the GPSIs in the list includes indication that "IsDefault/Basic". Option a.2) First GPSI in the list is considered as Default/Basic GPSI. |
| | Option a.1) Default/Basic GPSI | Default/Basic GPSI to be used e.g. in secondary authentication procedures when multiple GPSIs are included in the GPSI list. |
| | Option b) GPSI | GPSI to be used for the secondary authentication of any DNN. |
| | Internal Group ID-list | List of the subscribed internal group(s) that the UE belongs to. |
| | Trace Requirements | Trace requirements about a UE (e.g. trace reference, address of the Trace Collection Entity, etc . . .) is defined in TS 32.421 [39]. This information is only sent to a SMF in the HPLMN or one of its equivalent PLMN(s). |

TABLE 5.2.3.3.1-1-continued

| | UE Subscription data types | |
| --- | --- | --- |
| Subscription data type | Field | Description |
| | Session Management Subscription data contains one or more S-NSSAI level subscription data: | |
| | S-NSSAI | Indicates the value of the S-NSSAI. |
| | Subscribed DNN list | List of the subscribed DNNs for the S-NSSAI (NOTE 1). |
| | For each DNN in S-NSSAI level subscription data: | |
| | DNN | DNN for the PDU Session. |
| | Frame Routes | Set of Frame Route information. A Frame Route refers to a range of IPv4 addresses/ IPv6 Prefixes to associate with a PDU Session established on this (DNN, S-NSSAI). See NOTE 4. |
| | Allowed PDU Session Types | Indicates the allowed PDU Session Types (IPv4, IPv6, IPv4v6, Ethernet, and Unstructured) for the DNN, S-NSSAI. See NOTE 6. |
| | Default PDU Session Type | Indicates the default PDU Session Type for the DNN, S-NSSAI. |
| | Allowed SSC modes | Indicates the allowed SSC modes for the DNN, S-NSSAI. |
| | Default SSC mode | Indicate the default SSC mode for the DNN, S-NSSAI. |
| | Interworking with EPS indication | Indicates whether interworking with EPS is supported for this DNN and S-NSSAI. |
| | 5GS Subscribed QoS profile | The QoS Flow level QoS parameter values (5QI and ARP) for the DNN, S-NSSAI (see clause 5.7.2.7 of TS 23.501 [2]). |
| | Charging Characteristics | It contains Charging Characteristics as defined in Annex A, clause A.1 of TS 32.255 [45]. This information, when provided, shall override any corresponding predefined information at the SMF. |
| | Subscribed-Session-AMBR | The maximum aggregated uplink and downlink MBRs to be shared across all Non-GBR QoS Flows in each PDU Session, which are established for the DNN, S-NSSAI. |
| | Static IP address/prefix | Indicate the static IP address/prefix for the DNN, S-NSSAI. |
| | User Plane Security Policy | Indicates the security policy for integrity protection and encryption for the user plane. |
| | PDU Session continuity at inter RAT mobility | Provides for this DDN, S-NSSAI how to handle a PDU Session when UE the moves to or from NB-IoT. Possible values are: maintain the PDU session; disconnect the PDU session with a reactivation request; disconnect PDU session without reactivation request; or to leave it to local VPLMN policy. |
| | NEF Identity for NIDD | When present, indicates, per S-NSSAI and per DNN, the identity of the NEF to anchor Unstructured PDU Session. When not present for the S-NSSAI and DNN, the PDU session terminates in UPF (see NOTE 8). |
| | NIDD information | Information such as External Group Identifier, External Identifier, MSISDN, or AF ID used for SMF-NEF Connection. |
| | SMF-Associated Expected UE Behaviour parameters | Parameters on expected characteristics of a PDU Session their corresponding validity times as specified in clause 4.15.6.3. |
| | SMF-Associated Network Configuration parameters | Parameters on expected PDU session characteristics their corresponding validity times as specified in clause 4.15.6.3a. |
| | ATSSS information | Indicates whether MA PDU session establishment is allowed. |
| | Secondary authentication indication | Indicates that whether the Secondary authentication/authorization is required for PDU Session Establishment as specified in clause 4.3.2.3. |
| | Option b) GPSI | GPSI to be used for the secondary authentication of the corresponding DNN. |
| Identifier translation | SUPI | Corresponding SUPI for input GPSI. |
| | (Optional) MSISDN | Corresponding GPSI (MSISDN) for input GPSI (External Identifier). This is optionally provided for legacy SMS infrastructure not supporting MSISDN-less SMS. The |

TABLE 5.2.3.3.1-1-continued

UE Subscription data types

| Subscription data type | Field | Description |
|---|---|---|
| | GPSI | presence of an MSISDN should be interpreted as an indication to the NEF that MSISDN shall be used to identify the UE when sending the SMS to the SMS-SC via T4. Corresponding GPSI for input SUPI and Application Port ID. |
| Intersystem continuity Context | (DNN, PGW FQDN) list | For each DNN, indicates the PGW-C + SMF which support interworking with EPC. |
| LCS privacy (data needed by GMLC) | LCS privacy profile data | Provides information for LCS privacy classes and Location Provacy Indication (LPI) as defined in clause 5.4.2 in TS 23.273 [51] |
| LCS mobile origination (data needed by AMF) | LCS Mobile Originated Data | When present, indicates to the serving AMF which LCS mobile originated services are subscribed as defined in clause 7.1 in TS 23.273 [51]. |
| UE reachability | UE reachability information | Provides, per PLMN, the list of NF IDs or the list of NF sets or the list of NF types authorized to request notification for UE's reachability (NOTE 7). |
| Steering of Roaming information | Steering of Roaming | List of preferred PLMN/access technology combinations or HPLMN indication that no change of the "Operator Controlled PLMN Selector with Access Technology" list stored in the UE is needed (see NOTE 3). Optionally, it includes an indication that the UDM requests an acknowledgement of the reception of this information from the UE. |

(NOTE 1):
The Subscribed DNN list can include a wildcard DNN.
(NOTE 2):
The default DNN shall not be a wildcard DNN.
(NOTE 3):
The Steering of Roaming information and UDM Update Data are protected using the mechanisms defined in TS 33.501 [15].
NOTE 4:
Frame Route(s) are defined in TS 23.501 [2]. Frame Route information may refer to a range of IPv4 addresses (an IPv4 address and an IPv4 address mask) and/or a range of IPv6 Prefixes (an IPv6 Prefix and an IPv6 Prefix length).
(NOTE 5):
Depending on the scenario PGW-C FQDN may be for S5/S8, or for S2b (ePDG case).
NOTE 6:
The Allowed PDU Session Types configured for a DNN which supports interworking with EPC should contain only the PDU Session Type corresponding to the PDN Type configured in the APN that corresponds to the DNN.
(NOTE 7):
Providing a list of NF types or a list of NF sets may be more appropriate for some deployments, e.g. in highly dynamic NF lifecycle management deployments.
(NOTE 8):
For a S-NSSAI and a DNN, the "Invoke NEF Indication" shall be present in the SMF selection subscription data if and only if the "NEF Identity for NIDD" Session Management Subscription Data includes a NEF Identity. When the "NEF Identity for NIDD" Session Management Subscription Data includes a NEF Identity for a S-NSSAI and DNN, the "Control Plane Only Indicator" will always be set for PDU Sessions to this S-NSSAI and DNN (see TS 23.501 [2], clause 5.31.4.1).

45

In view of the above modifications and variations, FIG. 5 depicts a method performed by network equipment 26 in a wireless communication network 10 in accordance with particular embodiments. The method includes receiving, from a data management network node 12 in the wireless communication network 10, control signaling 42 that indicates which generic subscription identifier among one or more generic subscription identifiers 38-1 . . . 38-N in a list 40 for a wireless device 16 is to be used by default or is to be used for a secondary or slice-specific access control procedure (Block 500). Here, each generic subscription identifier generically addresses a subscription to the wireless communication network 10 in different data networks outside the wireless communication network 10. The method in some embodiments may also include triggering the secondary or slice-specific access control procedure using the generic subscription identifier indicated by the control signaling 42 (Block 510).

FIG. 5 depicts a method performed by a data management network node 12 in a wireless communication network 10. The method comprises transmitting, to network equipment 26 in the wireless communication network 10, control signaling 42 that indicates which generic subscription identifier among one or more generic subscription identifiers 38-1 . . . 38-N in a list 40 for a wireless device 16 is to be used by default or is to be used for a secondary or slice-specific access control procedure (Block 510). Here, each generic subscription identifier generically addresses a subscription to the wireless communication network 10 in different data networks outside the wireless communication network 10. The method in some embodiments may also include receiving, from the network equipment 26, a request for subscription data for the wireless device 16 (Block 500). In this case, the transmitting may be performed responsive to the request.

Embodiments herein also include corresponding apparatuses. Embodiments herein for instance include network equipment 26 configured to perform any of the steps of any of the embodiments described above for the network equipment 26.

Embodiments also include network equipment 26 comprising processing circuitry and power supply circuitry. The processing circuitry is configured to perform any of the steps of any of the embodiments described above for the network equipment 26. The power supply circuitry is configured to supply power to the network equipment 26.

Embodiments further include network equipment 26 comprising processing circuitry. The processing circuitry is configured to perform any of the steps of any of the embodiments described above for the network equipment 26. In some embodiments, the network equipment 26 further comprises communication circuitry.

Embodiments further include network equipment 26 comprising processing circuitry and memory. The memory contains instructions executable by the processing circuitry whereby the network equipment 26 is configured to perform any of the steps of any of the embodiments described above for the network equipment 26.

Embodiments herein also include a data management network node 12 configured to perform any of the steps of any of the embodiments described above for the data management network node 12.

Embodiments also include a data management network node 12 comprising processing circuitry and power supply circuitry. The processing circuitry is configured to perform any of the steps of any of the embodiments described above for the data management network node 12. The power supply circuitry is configured to supply power to the data management network node 12.

Embodiments further include a data management network node 12 comprising processing circuitry. The processing circuitry is configured to perform any of the steps of any of the embodiments described above for the data management network node 12. In some embodiments, the data management network node 12 further comprises communication circuitry.

Embodiments further include a data management network node 12 comprising processing circuitry and memory. The memory contains instructions executable by the processing circuitry whereby the radio network node is configured to perform any of the steps of any of the embodiments described above for the data management network node 12.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 7:
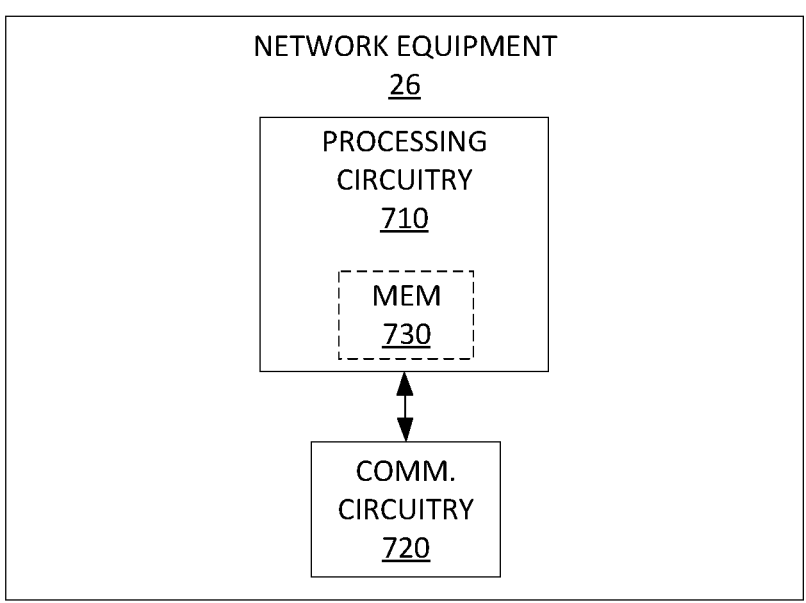
FIG. 7 is a block diagram of network equipment in a wireless communication network according to some embodiments.

FIG. 7 for example illustrates network equipment 26 as implemented in accordance with one or more embodiments.

As shown, the network equipment 26 includes processing circuitry 710 and communication circuitry 720. The communication circuitry 720 (e.g., radio circuitry) is configured to transmit and/or receive information to and/or from one or more other nodes, e.g., via any communication technology. The processing circuitry 710 is configured to perform processing described above, e.g., in FIGS. 2 and/or 5, such as by executing instructions stored in memory 730. The processing circuitry 710 in this regard may implement certain functional means, units, or modules.

Figure 8:
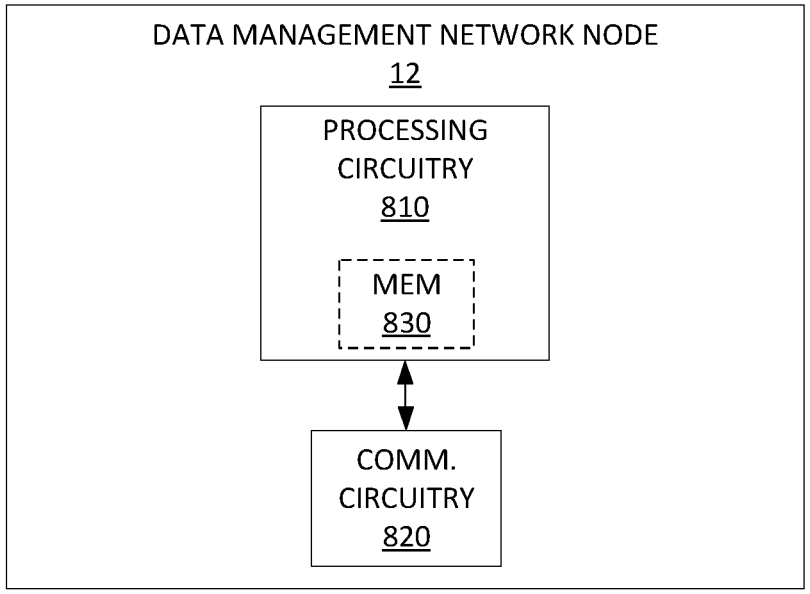
FIG. 8 is a block diagram of a data management network node in a wireless communication network according to some embodiments.

FIG. 8 illustrates a data management network node 12 as implemented in accordance with one or more embodiments. As shown, the data management network node 12 includes processing circuitry 810 and communication circuitry 820. The communication circuitry 820 is configured to transmit and/or receive information to and/or from one or more other nodes, e.g., via any communication technology. The processing circuitry 810 is configured to perform processing described above, e.g., in FIGS. 3A, 3B, and/or 5, such as by executing instructions stored in memory 830. The processing circuitry 810 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 9A:
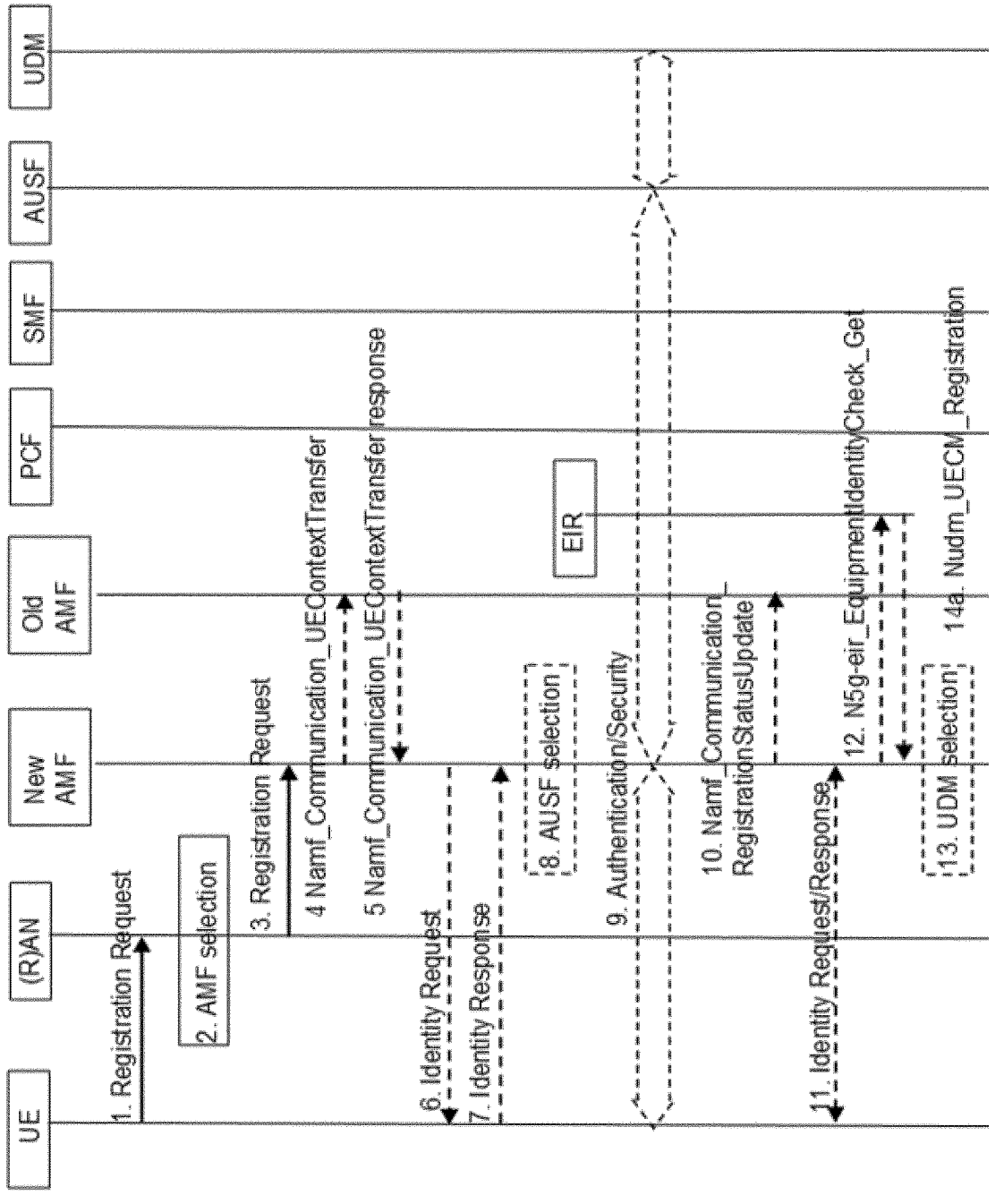
FIGS. 9A-9C are call flow diagrams of a registration procedure in a 5G System according to some embodiments.
Figure 9B:
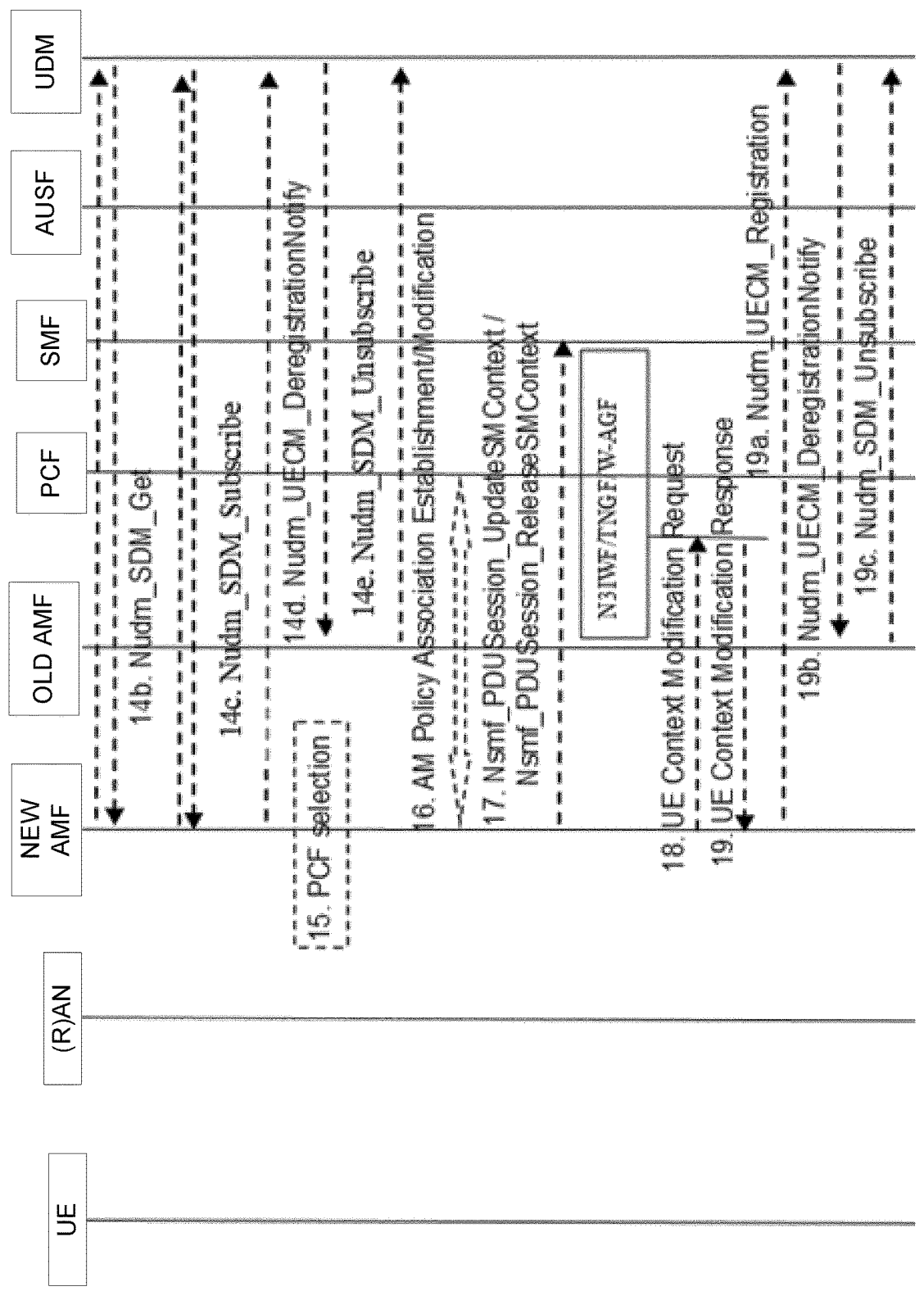
Figure 9C:
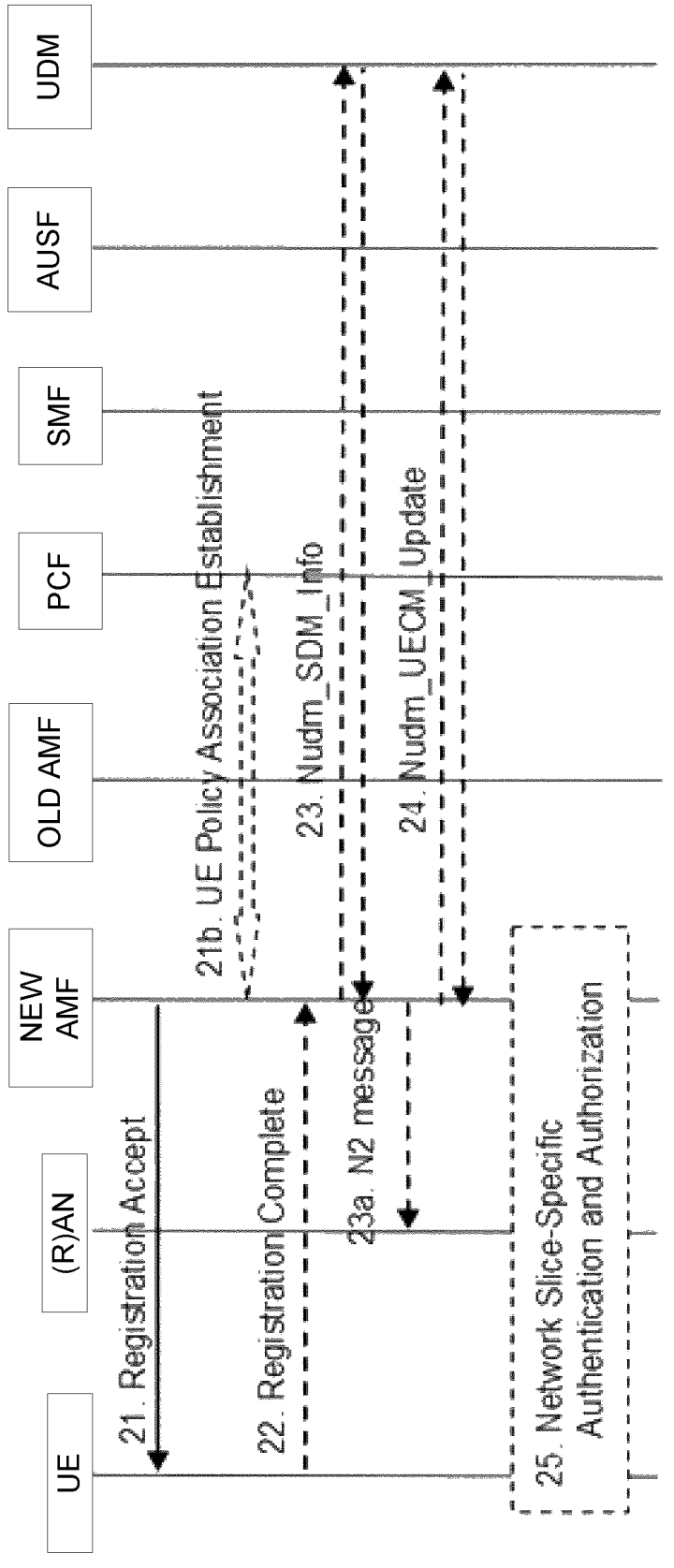

FIGS. 9A-9C show a registration procedure in a 5G System according to some embodiments.

1. UE to (R)AN: AN message (AN parameters, Registration Request (Registration type, SUCI or 5G-GUTI or PEI, . . . [Requested NSSAI], [Mapping Of Requested NSSAI], [Default Configured NSSAI Indication] . . . )).

In the case of NG-RAN, the AN parameters include e.g. 5G-S-TMSI or GUAMI, the Selected PLMN ID (or PLMN ID and NID, see TS 23.501 v16.4.0 clause 5.30) and Requested NSSAI, the AN parameters also include Establishment cause. The Establishment cause provides the reason for requesting the establishment of an RRC connection. Whether and how the UE includes the Requested NSSAI as part of the AN parameters is dependent on the value of the Access Stratum Connection Establishment NSSAI Inclusion Mode parameter, as specified in clause 5.15.9 of TS 23.501 v16.4.0.

The Registration type indicates if the UE wants to perform an Initial Registration (i.e. the UE is in RM-DEREGISTERED state), a Mobility Registration Update (i.e. the UE is in RM-REGISTERED state and initiates a Registration procedure due to mobility or due to the UE needs to update its capabilities or protocol parameters, or to request a change of the set of network slices it is allowed to use), a Periodic Registration Update (i.e. the UE is in RM-REGISTERED state and initiates a Registration procedure due to the Periodic Registration Update timer expiry, see clause 4.2.2.2.1) or an Emergency Registration (i.e. the UE is in limited service state).

The UE provides Requested NSSAI as described in TS 23.501 v16.4.0 clause 5.15.5.2.1, and in the case of Initial Registration or Mobility Registration Update, the UE includes the Mapping Of Requested NSSAI (if available), which is the mapping of each S-NSSAI of the Requested NSSAI to the HPLMN S-NSSAIs, to ensure that the network is able to verify whether the S-NSSAI(s) in the Requested NSSAI are permitted based on the Subscribed S-NSSAIs.

The UE includes the Default Configured NSSAI Indication if the UE is using a Default Configured NSSAI, as defined in TS 23.501.

Requested NSSAI indicates the Network Slice Selection Assistance Information (as defined in clause 5.15 of TS 23.501).

2. If a 5G-S-TMSI or GUAMI is not included or the 5G-S-TMSI or GUAMI does not indicate a valid AMF the (R)AN, based on (R)AT and Requested NSSAI, if available, selects an AMF 3. (R)AN to new AMF: N2 message (N2 parameters, Registration Request (as described in step 1) and [LTE-M Indication].

When NG-RAN is used, the N2 parameters include the Selected PLMN ID (or PLMN ID and NID, see TS 23.501, clause 5.30), Location Information and Cell Identity related to the cell in which the UE is camping, UE Context Request which indicates that a UE context including security information needs to be setup at the NG-RAN.

4. [Conditional] new AMF to old AMF: Namf_Communication_UEContextTransfer (complete Registration Request) or new AMF to UDSF: Nudsf_Unstructured Data Management_Query( ).

5. [Conditional] old AMF to new AMF: Response to Namf_Communication_UEContextTransfer (SUPI, UE Context in AMF (as per Table 5.2.2.2.2-1)) or UDSF to new AMF: Nudsf_Unstructured Data Management_Query( ).

If old AMF holds information about established PDU Session(s), the old AMF includes SMF information, DNN(s), S-NSSAI(s) and PDU Session ID(s).

6. [Conditional] new AMF to UE: Identity Request ( ).

If the SUCI is not provided by the UE nor retrieved from the old AMF the Identity Request procedure is initiated by AMF sending an Identity Request message to the UE requesting the SUCI.

7. [Conditional] UE to new AMF: Identity Response ( ).

The UE responds with an Identity Response message including the SUCI. The UE derives the SUCI by using the provisioned public key of the HPLMN, as specified in TS 33.501 v16.2.0.

8. The AMF may decide to initiate UE authentication by invoking an AUSF. In that case, the AMF selects an AUSF based on SUPI or SUCI, as described in TS 23.501, clause 6.3.4.

9a. If authentication is required, the AMF requests it from the AUSF. Upon request from the AMF, the AUSF shall execute authentication of the UE. The authentication is performed as described in TS 33.501 v16.2.0. The AUSF selects a UDM as described in TS 23.501, clause 6.3.8 and gets the authentication data from UDM.

Once the UE has been authenticated the AUSF provides relevant security related information to the AMF. If the AMF provided a SUCI to AUSF, the AUSF shall return the SUPI to AMF only after the authentication is successful.

After successful authentication in new AMF, which is triggered by the integrity check failure in old AMF at step 5, the new AMF invokes step 4 above again and indicates that the UE is validated (i.e. through the reason parameter as specified in clause 5.2.2.2.2).

9b. If NAS security context does not exist, the NAS security initiation is performed as described in TS 33.501 v16.2.0. If the UE had no NAS security context in step 1, the UE includes the full Registration Request message as defined in TS 24.501.

9c. The AMF initiates NGAP procedure to provide the 5G-AN with security context as specified in TS 38.413 [10] if the 5G-AN had requested for UE Context.

9d. The 5G-AN stores the security context and acknowledges to the AMF. The 5G-AN uses the security context to protect the messages exchanged with the UE as described in TS 33.501 v16.2.0.

10. [Conditional] new AMF to old AMF: Namf_Communication_RegistrationStatusUpdate (PDU Session ID(s) to be released due to slice not supported).

If the AMF has changed the new AMF informs the old AMF that the registration of the UE in the new AMF is completed by invoking the Namf_Communication_RegistrationStatusUpdate service operation.

If the authentication/security procedure fails, then the Registration shall be rejected, and the new AMF invokes the Namf_Communication_RegistrationStatusUpdate service operation with a reject indication towards the old AMF. The old AMF continues as if the UE context transfer service operation was never received.

If one or more of the S-NSSAIs used in the old Registration Area cannot be served in the target Registration Area, the new AMF determines which PDU Session cannot be supported in the new Registration Area. The new AMF invokes the Namf_Communication_RegistrationStatusUpdate service operation including the rejected PDU Session ID towards the old AMF. Then the new AMF modifies the PDU Session Status correspondingly. The old AMF informs the corresponding SMF(s) to locally release the UE's SM context by invoking the Nsmf_PDUSession_ReleaseSMContext service operation.

If new AMF received in the UE context transfer in step 2 the information about the AM Policy Association and the UE Policy Association and decides, based on local policies, not to use the PCF(s) identified by the PCF ID(s) for the AM Policy Association and the UE Policy Association, then it will inform the old AMF that the AM Policy Association and the UE Policy Association in the UE context is not used any longer and then the PCF selection is performed in step 15.

11. [Conditional] new AMF to UE: Identity Request/ Response (PEI).

If the PEI was not provided by the UE nor retrieved from the old AMF the Identity Request procedure is initiated by AMF sending an Identity Request message to the UE to retrieve the PEI. The PEI shall be transferred encrypted unless the UE performs Emergency Registration and cannot be authenticated.

12. Optionally the new AMF initiates ME identity check by invoking the N5g-eir_EquipmentIdentityCheck_Get service operation 13. If step 14 is to be performed, the new AMF, based on the SUPI, selects a UDM, then UDM may select a UDR instance. See TS 23.501, clause 6.3.9.

The AMF selects a UDM as described in TS 23.501, clause 6.3.8.

14a-c. If the AMF has changed since the last Registration procedure, or if the UE provides a SUPI which doesn't refer to a valid context in the AMF, or if the UE registers to the same AMF it has already registered to a non-3GPP access (i.e. the UE is registered over a non-3GPP access and initiates this Registration procedure to add a 3GPP access), the new AMF registers with the UDM using Nudm_UECM_Registration for the access to be registered (and subscribes to be notified when the UDM deregisters this AMF).

If the AMF does not have subscription data for the UE, the AMF retrieves the Access and Mobility Subscription data, SMF Selection Subscription data, UE context in SMF data and LCS mobile origination using Nudm_SDM_Get. If the AMF already has subscription data for the UE but the SoR Update Indicator in the UE context requires the AMF to retrieve SoR information depending on the NAS Registration Type ("Initial Registration" or "Emergency Registration") (see Annex C of TS 23.122), the AMF retrieves the Steering of Roaming information using Nudm_SDM_Get. This requires that UDM may retrieve this information from UDR by Nudr_DM_Query. After a successful response is received, the AMF subscribes to be notified using Nudm_SDM_Subscribe when the data requested is modified, UDM may subscribe to UDR by Nudr_DM_Subscribe. The GPSI is provided to the AMF in the Access and Mobility Subscription data from the UDM if the GPSI is available in the UE subscription data. The UDM may provide indication that the subscription data for network slicing is updated for the UE.

The new AMF creates an UE context for the UE after getting the Access and Mobility Subscription data from the UDM. The Access and Mobility Subscription data includes whether the UE is allowed to include NSSAI in the 3GPP access RRC Connection Establishment in clear text.

14d. When the UDM stores the associated Access Type (e.g. 3GPP) together with the serving AMF as indicated in step 14a, it will cause the UDM to initiate a Nudm_UECM_DeregistrationNotification to the old AMF corresponding to the same (e.g. 3GPP) access, if one exists.

14e. [Conditional] If old AMF does not have UE context for another access type (i.e. non-3GPP access), the Old AMF unsubscribes with the UDM for subscription data using Nudm_SDM_unsubscribe.

15. PCF selection

16. [Optional] new AMF performs an AM Policy Association Establishment/Modification.

If the AMF supports DNN replacement, the AMF provides the PCF with the Allowed NSSAI and, if available, the Mapping Of Allowed NSSAI.

If the PCF supports DNN replacement, the PCF provides the AMF with triggers for DNN replacement.

17. [Conditional] AMF to SMF: Nsmf_PDUSession_UpdateSMContext ( ).

18. [Conditional] If the new AMF and the old AMF are in the same PLMN, the new AMF sends a UE Context Modification Request to N3IWF/TNGF/W-AGF as specified in TS 29.413.

19. N3IWF/TNGF/W-AGF sends a UE Context Modification Response to the new AMF.

19a. [Conditional] After the new AMF receives the response message from the N3IWF, W-AGF or TNGF in step 19, the new AMF registers with the UDM using Nudm_UECM_Registration as step 14a, but with the Access Type set to "non-3GPP access". The UDM stores the associated Access Type together with the serving AMF and does not remove the AMF identity associated to the other Access Type if any. The UDM may store in UDR information provided at the AMF registration by Nudr_DM_Update.

19b. [Conditional] When the UDM stores the associated Access Type (i.e. non-3GPP) together with the serving AMF as indicated in step 19a, it will cause the UDM to initiate a Nudm_UECM_DeregistrationNotification to the old AMF corresponding to the same (i.e. non-3GPP) access. The old AMF removes the UE context for non-3GPP access.

19c. The Old AMF unsubscribes with the UDM for subscription data using Nudm_SDM_unsubscribe.

20a. Void.

21. New AMF to UE: Registration Accept (5G-GUTI, Registration Area, [Mobility restrictions], [PDU Session status], [Allowed NSSAI], [Mapping Of Allowed NSSAI], . . . .

If the Requested NSSAI does not include S-NSSAIs which map to S-NSSAIs of the HPLMN subject to Network Slice-Specific Authentication and Authorization and the AMF determines that no S-NSSAI can be provided in the Allowed NSSAI for the UE in the current UE's Tracking Area and if no default S-NSSAI(s) not yet involved in the current UE Registration procedure could be further considered, the AMF shall reject the UE Registration and shall include in the rejection message the list of Rejected S-NSSAIs, each of them with the appropriate rejection cause value.

The Allowed NSSAI for the Access Type for the UE is included in the N2 message carrying the Registration Accept message. The Allowed NSSAI contains only S-NSSAIs that do not require, based on subscription information, Network Slice-Specific Authentication and Authorization, or based on the UE Context in the AMF, those S-NSSAIs for which Network Slice-Specific Authentication and Authorization previously succeeded, regardless of the Access Type.

If the UE has indicated its support for Network Slice-Specific Authentication and Authorization procedure in the UE MM Core Network Capability in the Registration Request, AMF includes in the Pending NSSAI the S-NSSAIs that map to an S-NSSAI of the HPLMN which in the subscription information has indication that it is subject to Network Slice-Specific Authentication and Authorization, as described in clause 4.6.2.4 of TS 24.501. In such case, the AMF then shall trigger at step 25 the Network Slice-Specific Authentication and Authorization procedure, except, based on Network policies, for those S-NSSAIs for which Network Slice-Specific Authentication and Authorization have already been initiated on another Access Type for the same S-NSSAI(s). The UE shall not attempt re-registration with the S-NSSAIs included in the list of Pending NSSAIs until the Network Slice-Specific Authentication and Authorization procedure has been completed, regardless of the Access Type.

If no S-NSSAI can be provided in the Allowed NSSAI because:
  all the S-NSSAI(s) in the Requested NSSAI are to be subject to Network Slice-Specific Authentication and Authorization; or
  no Requested NSSAI was provided or none of the S-NSSAIs in the Requested NSSAI matches any of the Subscribed S-NSSAIs, and all the S-NSSAI(s) marked as default in the Subscribed S-NSSAIs are to be subject to Network Slice-Specific Authentication and Authorization.

The AMF shall provide an empty Allowed NSSAI. Upon receiving an empty Allowed NSSAI and a Pending NSSAI, the UE is registered in the PLMN but shall wait for the completion of the Network Slice-Specific Authentication and Authorization procedure without attempting to use any service provided by the PLMN except emergency services (the AMF assigns the Tracking Areas of the Registration Area as a Non-Allowed Area).

The AMF sends a Registration Accept message to the UE indicating that the Registration Request has been accepted.

The Allowed NSSAI provided in the Registration Accept is valid in the Registration Area and it applies for all the PLMNs which have their Tracking Areas included in the Registration Area. The Mapping Of Allowed NSSAI is the mapping of each S-NSSAI of the Allowed NSSAI to the HPLMN S-NSSAIs. The Mapping Of Configured NSSAI is the mapping of each S-NSSAI of the Configured NSSAI for the Serving PLMN to the HPLMN S-NSSAIs.

21b. [Optional] The new AMF performs a UE Policy Association Establishment.

22. [Conditional] UE to new AMF: Registration Complete ( ).

The UE sends a Registration Complete message to the AMF when it has successfully updated itself after receiving any of the [Configured NSSAI for the Serving PLMN], [Mapping Of Configured NSSAI] and a Network Slicing Subscription Change Indication, or CAG information in step 21.

The UE sends a Registration Complete message to the AMF to acknowledge if a new 5G-GUTI was assigned.

23. [Conditional] AMF to UDM: If the Access and Mobility Subscription data provided by UDM to AMF in 14b includes Steering of Roaming information with an indication that the UDM requests an acknowledgement of the reception of this information from the UE, the AMF provides the UE acknowledgement to UDM using Nudm_SDM_Info.

23a. For Registration over 3GPP Access, if the AMF does not release the signalling connection, the AMF sends the RRC Inactive Assistance Information to the NG-RAN.

For Registration over non-3GPP Access, if the UE is also in CM-CONNECTED state on 3GPP access, the AMF sends the RRC Inactive Assistance Information to the NG-RAN.

Figure 10A:
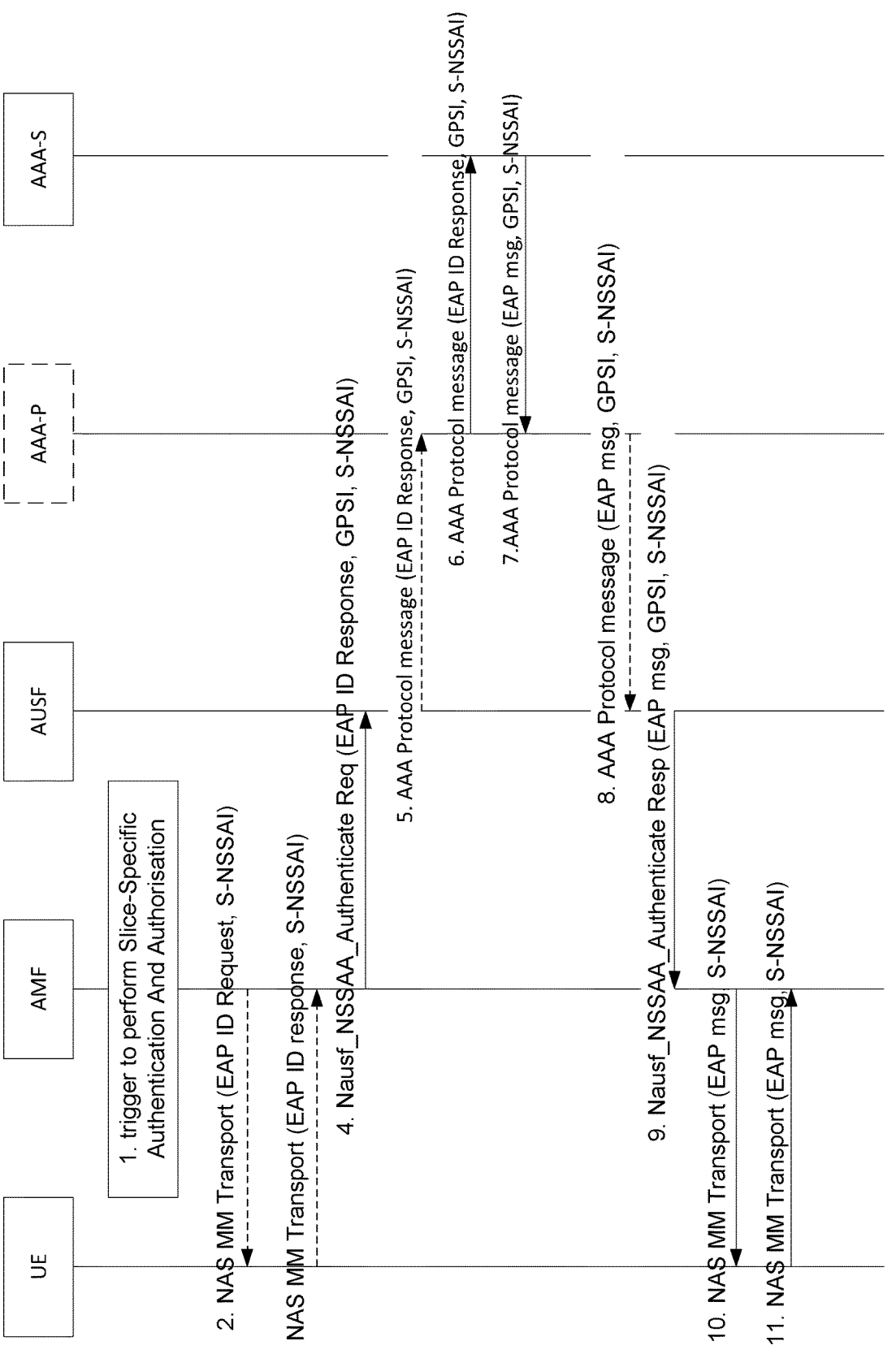
FIGS. 10A-10B are call flow diagrams of an authentication and authorization procedure in a 5G System according to some embodiments.
Figure 10B:
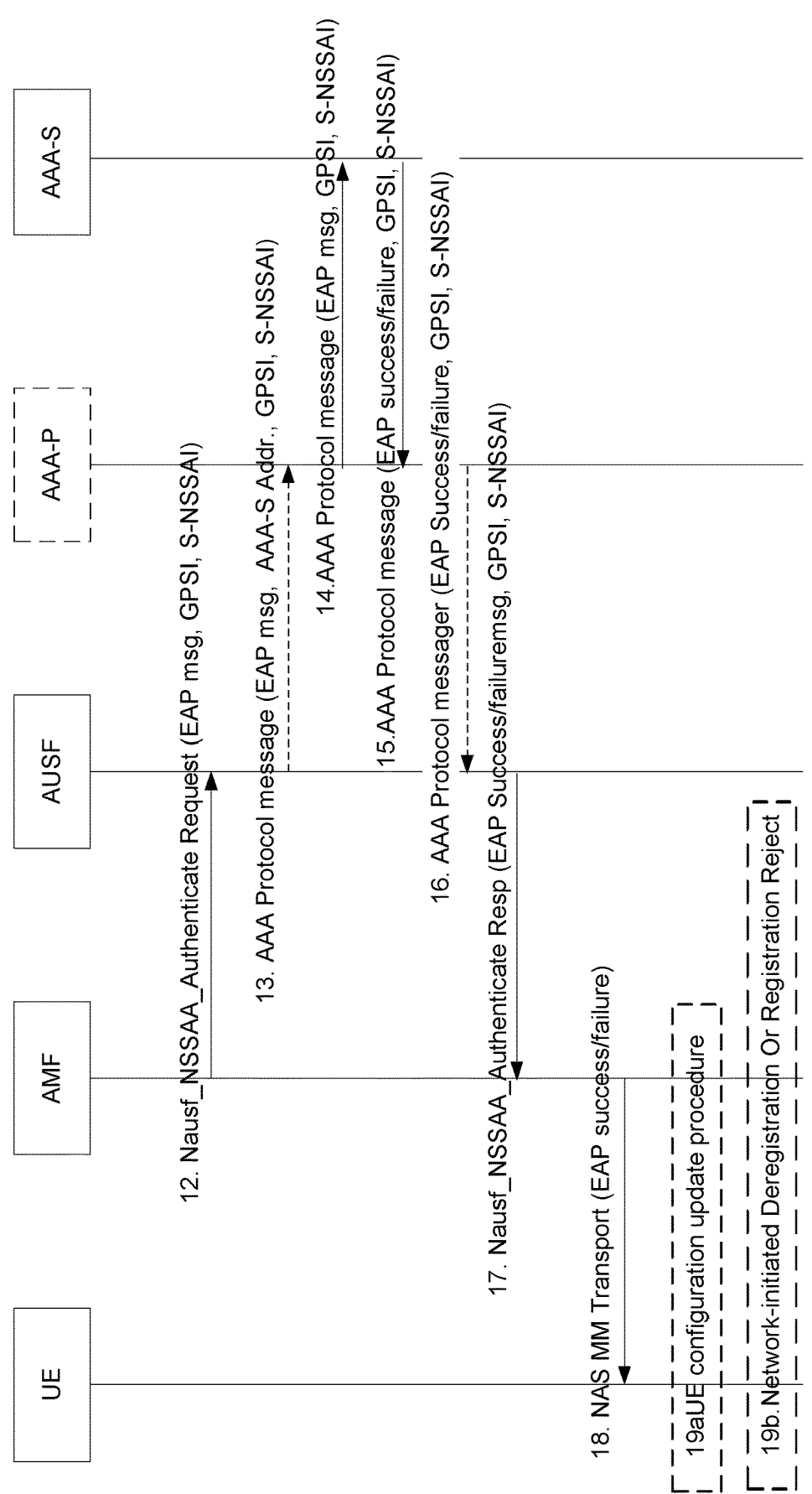

24. [Conditional] AMF to UDM: After step 14a, and in parallel to any of the preceding steps, the AMF shall send a "Homogeneous Support of IMS Voice over PS Sessions" indication to the UDM using Nudm_UECM_Update:

25. [Conditional] If the UE indicates its support for Network Slice-Specific Authentication and Authorization procedure in the UE MM Core Network Capability in Registration Request, and any S-NSSAI of the HPLMN is subject to Network Slice-Specific Authentication and Authorization, the related procedure in FIGS. 10A-10B may or may not be triggered and executed at this step, e.g., in some embodiments as described with respect to FIG. 1. Once the Network Slice-Specific Authentication and Authorization procedure is completed for all S-NSSAIs, the AMF shall trigger a UE Configuration Update procedure to deliver an Allowed NSSAI containing also the S-NSSAIs for which the Network Slice-Specific Authentication and Authorization was successful, and include any rejected NSSAIs with an appropriate rejection cause value.

The AMF stores an indication in the UE context for any S-NSSAI of the HPLMN subject to Network Slice-Specific Authentication and Authorization for which the Network Slice-Specific Authentication and Authorization succeeds.

Once completed the Network Slice-Specific Authentication and Authorization procedure, if the AMF determines that no S-NSSAI can be provided in the Allowed NSSAI for the UE, which is already authenticated and authorized successfully by a PLMN, and if no default S-NSSAI(s) could be further considered, the AMF shall execute the Network-initiated Deregistration procedure 3, and shall include in the explicit De-Registration Request message the list of Rejected S-NSSAIs, each of them with the appropriate rejection cause value.

Consider now additional details of the Network Slice-Specific Authentication and Authorization procedure shown in FIGS. 10A-10B.

The Network Slice-Specific Authentication and Authorization procedure is triggered for an S-NSSAI requiring Network Slice-Specific Authentication and Authorization with an AAA Server (AAA-S) which may be hosted by the H-PLMN operator or by a third party which has a business relationship with the H-PLMN, using the EAP framework as described in TS 33.501 v16.2.0. An AAA Proxy (AAA-P) in the HPLMN may be involved, e.g., if the AAA Server belongs to a third party.

This procedure is triggered by the AMF during a Registration procedure when some Network Slices require Slice-Specific Authentication and Authorization, when AMF determines that Network Slice-Specific Authentication and Authorization is required for an S-NSSAI in the current Allowed NSSAI (e.g. subscription change), or when the AAA Server that authenticated the Network Slice triggers a re-authentication.

The AMF performs the role of the EAP Authenticator and communicates with the AAA-S via the AUSF. The AUSF undertakes any AAA protocol interworking with the AAA protocol supported by the AAA-S.

1. For S-NSSAIs that are requiring Network Slice-Specific Authentication and Authorization, based on change of subscription information, or triggered by the AAA-S, the AMF may or may not trigger the start of the Network Slice Specific Authentication and Authorization procedure, e.g., as described with respect to FIG. 1. For example, if the subscription data for the UE includes a GPSI for the UE, the start of the Network Slice Specific Authentication and Authorization may be triggered. But, if the subscription data for the UE lacks a GPSI for the UE, the start of the Network Slice Specific Authentication and Authorization may not be triggered, e.g., its triggering may be suppressed, skipped, or otherwise averted so that it does not execute or so that its execution fails prematurely.

In any event, if Network Slice Specific Authentication and Authorization is triggered as a result of Registration procedure, the AMF may determine, based on UE Context in the AMF, that for some or all S-NSSAI(s) subject to Network Slice Specific Authentication and Authorization, the UE has already been authenticated following a Registration procedure on a first access. Depending on Network Slice Specific Authentication and Authorization result (e.g. success/failure) from the previous Registration, the AMF may decide, based on Network policies, to skip Network Slice Specific Authentication and Authorization for these S-NSSAIs during the Registration on a second access.

If the Network Slice Specific Authentication and Authorization procedure corresponds to a re-authentication and re-authorization procedure triggered as a result of AAA Server-triggered UE re-authentication and re-authorization for one or more S-NSSAIs, or triggered by the AMF based on operator policy or a subscription change and if S-NSSAIs that are requiring Network Slice-Specific Authentication and Authorization are included in the Allowed NSSAI for each Access Type, the AMF selects an Access Type to be used to perform the Network Slice Specific Authentication and Authorization procedure based on network policies.

2. The AMF may send an EAP Identity Request for the S-NSSAI in a NAS MM Transport message including the S-NSSAI. This is the S-NSSAI of the H-PLMN, not the locally mapped S-NSSAI value.

3. The UE provides the EAP Identity Response for the S-NSSAI alongside the S-NSSAI in an NAS MM Transport message towards the AMF.

4. The AMF sends the EAP Identity Response to the AUSF in a Nausf_NSSAA_Authenticate Request (EAP Identity Response, AAA-S address, GPSI, S-NSSAI).

5. If the AAA-P is present (e.g. because the AAA-S belongs to a third party and the operator deploys a proxy towards third parties), the AUSF forwards the EAP ID Response message to the AAA-P, otherwise the AUSF forwards the message directly to the AAA-S. The AUSF uses towards the AAA-P or the AAA-S an AAA protocol message of the same protocol supported by the AAA-S.

6. The AAA-P forwards the EAP Identity message to the AAA-S addressable by the AAA-S address together with S-NSSAI and GPSI. The AAA-S stores the GPSI to create an association with the EAP Identity in the EAP ID response message, so the AAA-S can later use it to revoke authorization or to trigger reauthentication.

7-14. EAP-messages are exchanged with the UE. One or more than one iteration of these steps may occur.

15. EAP authentication completes. The AAA-S stores the S-NSSAI for which the authorisation has been granted, so it may decide to trigger reauthentication and reauthorization based on its local policies. An EAP-Success/Failure message is delivered to the AAA-P (or if the AAA-P is not present, directly to the AUSF) with GPSI and S-NSSAI.

16. If the AAA-P is used, the AAA-P sends an AAA Protocol message including (EAP-Success/Failure, S-NS-SAI, GPSI) to the AUSF.

17. The AUSF sends the ausf_NSSAA_Authenticate Response (EAP-Success/Failure, S-NSSAI, GPSI) to the AMF.

18. The AMF transmits a NAS MM Transport message (EAP-Success/Failure) to the UE. The AMF shall store the EAP result for each S-NSSAI for which the NSSAA procedure in steps 1-17 was executed.

19a. [Conditional] If a new Allowed NSSAI (i.e. including any new S-NSSAIs in a Requested NSSAI for which the NSSAA procedure succeeded and/or excluding any S-NS-SAI(s) in the existing Allowed NSSAI for the UE for which the procedure has failed) and/or new Rejected S-NSSAIs (i.e. including any S-NSSAI(s) in the existing Allowed NSSAI for the UE for which the procedure has failed, or any new requested S-NSSAI(s) for which the NSSAA procedure failed) need to be delivered to the UE, or if the AMF re-allocation is required, the AMF initiates the UE Configuration Update procedure, for each Access Type, as described in clause 4.2.4.2.

19b. [Conditional] If the Network Slice-Specific Authentication and Authorization fails for all S-NSSAIs (if any) in the existing Allowed NSSAI for the UE and (if any) for all S-NSSAIs in the Requested NSSAI, the AMF shall execute the Network-initiated Deregistration procedure, or reject the UE Registration Request (if that was the trigger for this procedure), and it shall include in the explicit De-Registration Request or Registration Reject message the list of Rejected S-NSSAIs, each of them with the appropriate rejection cause value. If the Network Slice-Specific Re-Authentication and Re-Authorization fails and there are PDU session(s) established that are associated with the S-NSSAI for which the NSSAA procedure failed, the AMF shall initiate the PDU Session Release procedure to release the PDU sessions with the appropriate cause value.

Figure 11:
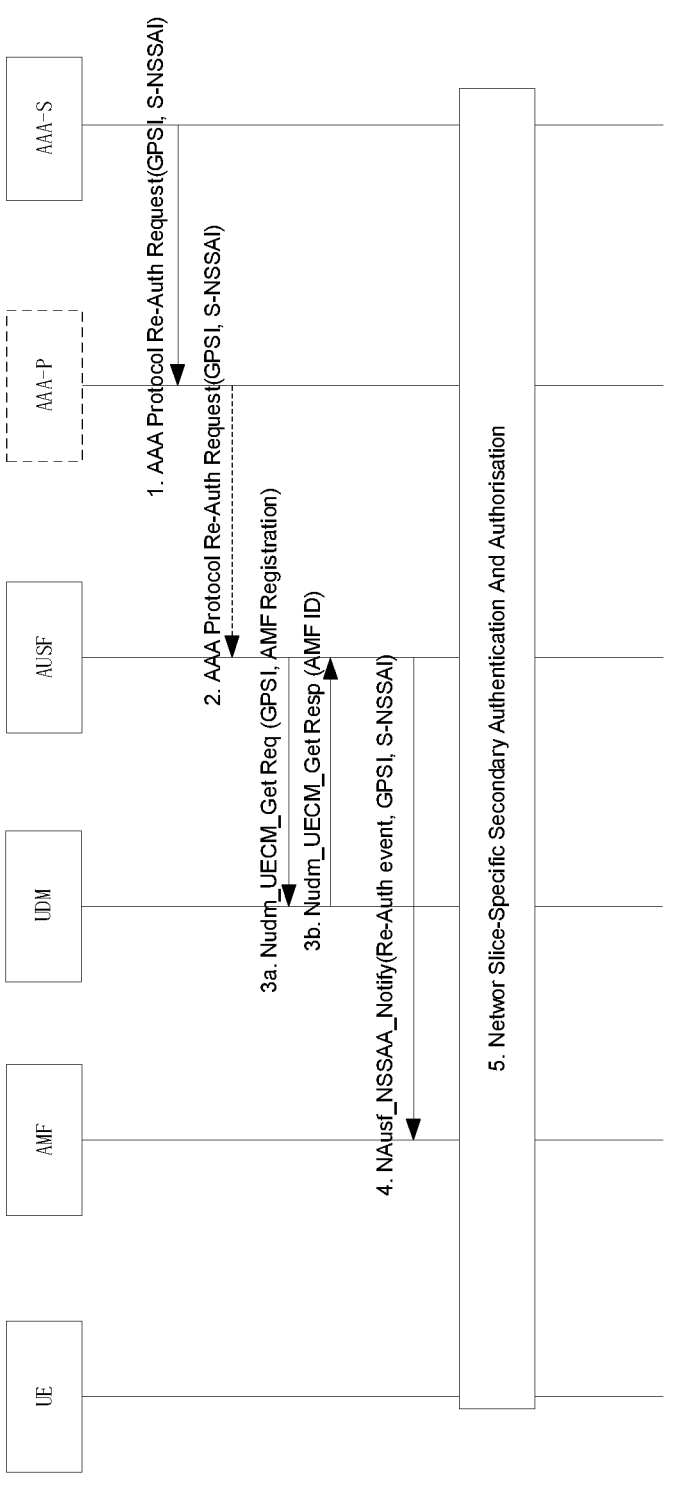
FIG. 11 is a call flow diagram of an AAA-S initiated re-authentication NSSAA procedure according to some embodiments.

FIG. 11 now shows the AAA-S initiated re-authentication NSSAA procedure.

1. The AAA-S requests the re-authentication and re-authorization for the Network Slice specified by the S-NSSAI in the AAA protocol Re-Auth Request message, for the UE identified by the GPSI in this message. This message is sent to a AAA-P, if the AAA-P is used (e.g. the AAA Server belongs to a third party), otherwise it is sent directly to the AUSF.

2. The AAA-P, if present, relays the request to the AUSF.

3a-3b. AUSF gets AMF ID from UDM using Nudm_UECM_Get with the GPSI in the received AAA message.

4. The AUSF notifies Re-auth event to the AMF to re-authenticate/re-authorize the S-NSSAI for the UE using Nausf_NSSAA_Notify with the GPSI and S-NS-SAI in the received AAA message. The callback URI of the notification for the AMF is derived via NRF as specified in TS 29.501 [62].

5. The AMF triggers the Network Slice-Specific Authentication and Authorization procedure, Generally, then, as seen in FIGS. 9A-9C, the AMF includes a GPSI in step 4 which is forwarded up to the AAA-S in step 6. Then, when the AAA-S triggers the re-authentication procedure, the AAA-S includes the UEs GPSI as shown in FIG. 11 step 1. Then, the GPSI is used within the 5GS to locate the UE in a certain AMF and to complete the procedure accordingly. The 5GS thereby uses a GPSI as a means to bind the initial authentication with the possible subsequent AAA-S triggered re-authentication/re-vocation procedure.

Consider now a procedure for Secondary authorization/ authentication by an DN-AAA server during the PDU Session establishment. Such Secondary authorization/authentication is specified in TS 23.502 v16.4.0 and TS 33.501 v16.2.0.

The following description applies at PDU Session Establishment to a DN. The DN-specific identity (TS 33.501 v16.2.0) of a UE may be authenticated/authorized by the DN. NOTE 1: the DN-AAA server may belong to the 5GC or to the DN.

If the UE provides authentication/authorization information corresponding to a DN-specific identity during the Establishment of the PDU Session, and the SMF determines that Secondary authentication/authorization of the PDU Session Establishment is required based on the SMF policy associated with the DN, the SMF may or may not pass the authentication/authorization information of the UE to the DN-AAA server via the UPF if the DN-AAA server is located in the DN, e.g., as described in embodiments with respect to FIG. 1. If the SMF determines that Secondary authentication/authorization of the PDU Session Establishment is required but the UE has not provided a DN-specific identity as part of the PDU Session Establishment request, the SMF requests the UE to indicate a DN-specific identity using EAP procedures as described in TS 33.501 v16.2.0. If the Secondary authentication/authorization of the PDU Session Establishment fails, the SMF rejects the PDU Session Establishment.

NOTE 2: If the DN-AAA server is located in the 5GC and reachable directly, then the SMF may communicate with it directly without involving the UPF.

The DN-AAA server may authenticate/authorize the PDU Session Establishment.

When DN-AAA server authorizes the PDU Session Establishment, it may send DN Authorization Data for the established PDU Session to the SMF. The DN authorization data for the established PDU Session may include one or more of the following:

A DN Authorization Profile Index which is a reference to authorization data for policy and charging control locally configured in the SMF or PCF.

a list of allowed MAC addresses for the PDU Session; this shall apply only for PDU Session of Ethernet PDU type.

a list of allowed VIDs for the PDU Session; this shall apply only for PDU Session of Ethernet PDU type.

DN authorized Session AMBR for the PDU Session. The DN Authorized Session AMBR for the PDU Session takes precedence over the subscribed Session-AM BR received from the UDM.

a list of Framed Routes for the PDU Session.

SMF policies may require DN authorization without Secondary authentication/authorization. In that case, when contacting the DN-AAA server for authorization, the SMF provides the GPSI of the UE if available.

Such Secondary authentication/authorization takes place for the purpose of PDU Session authorization in addition to:

The 5GC access authentication handled by AMF.

The PDU Session authorization enforced by SMF with regard to subscription data retrieved from UDM.

Based on local policies the SMF may initiate Secondary authentication/authorization at PDU Session Establishment. In some embodiments, the SMF provides the GPSI, if available, in the signalling exchanged with the DN-AAA during Secondary authentication/authorization. In other embodiments, the SMF is required to provide the GPSI in the signalling exchanged with the DN-AAA during Secondary authentication/authorization.

After the successful Secondary authentication/authorization, a session is kept between the SMF and the DN-AAA.

The UE provides the authentication/authorization information required to support Secondary authentication/authorization by the DN over NAS SM.

Indication of PDU Session Establishment rejection is transferred by SMF to the UE via NAS SM.

At any time, a DN-AAA server may revoke the authorization for a PDU Session or update DN Authorization Data for a PDU Session. According to the request from DN-AAA server, the SMF may release or update the PDU Session.

At any time, a DN-AAA server or SMF may trigger Secondary Re-authentication procedure for a PDU Session established with Secondary Authentication as specified in clause 11.1.3 in TS 33.501 v16.2.0.

During Secondary Re-authentication/Re-authorization, if the SMF receives from DN-AAA the DN authorized Session AM BR and/or DN Authorization Profile Index, the SMF shall report the received value(s) to the PCF.

Figure 12:
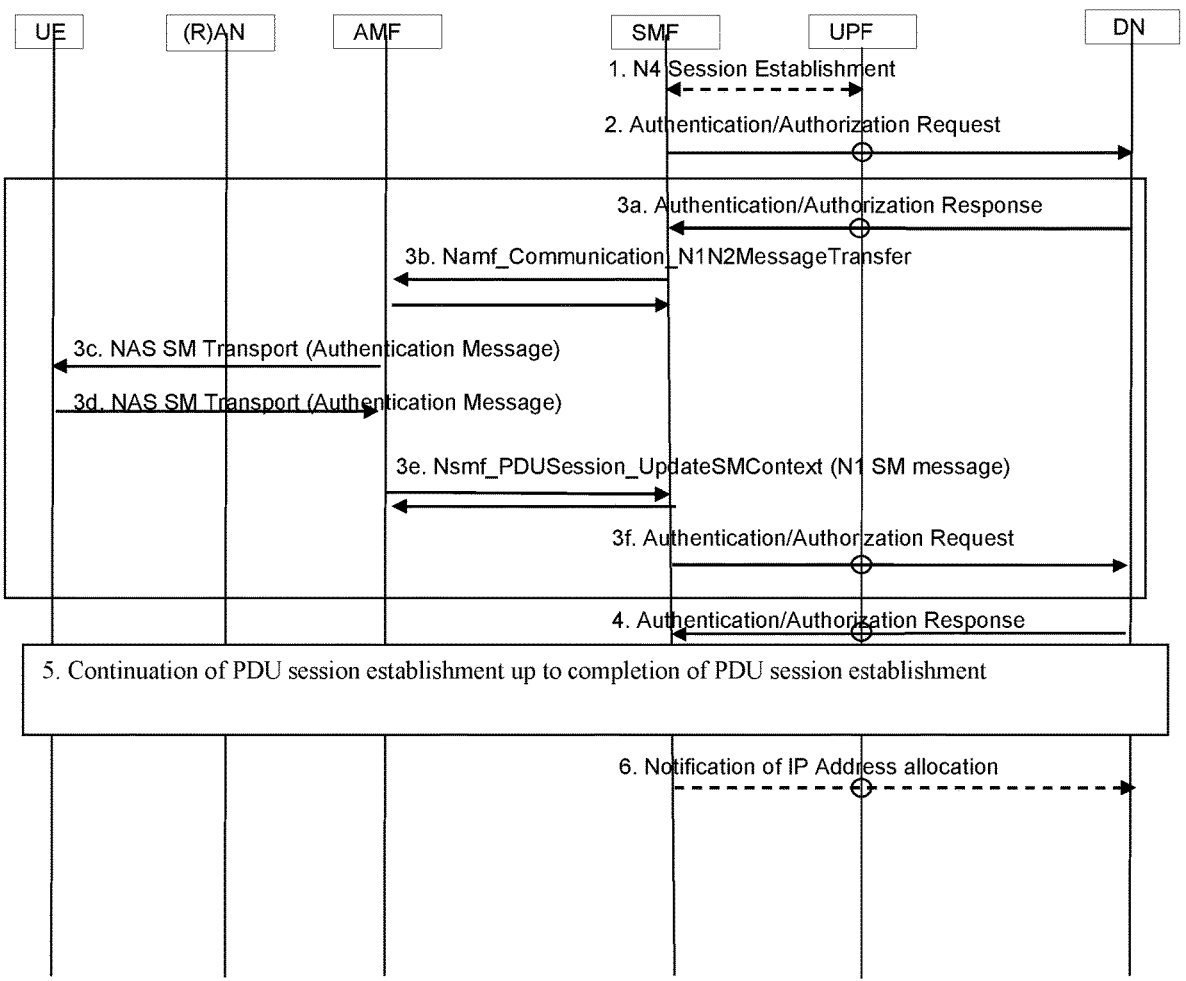
FIG. 12 is a call flow diagram of a procedure for secondary authentication/authorization by a DN-AAA server during the establishment of a PDU Session according to some embodiments.

The procedure for secondary authentication/authorization by a DN-AAA server during the establishment of a PDU Session is described in TS 23.502 v16.4.0 clause 4.3.2.3 and shown in FIG. 12.

0. The SMF determines that it needs to contact the DN-AAA server, e.g., depending on the embodiments shown in FIG. 1. The SMF identifies the DN-AAA server based on local configuration or using the DN-specific identity (TS 33.501 v16.2.0) provided by the UE inside the SM PDU DN Request Container provided by the UE in the PDU Session Establishment request or inside the EAP message in the PDU Session Authentication Complete message (TS 24.501).

NOTE 3: The content of the SM PDU DN Request Container is defined in TS 24.501.

1. If there is no existing N4 session that can be used to carry DN-related messages between the SMF and the DN, the SMF selects a UPF and triggers N4 session establishment.

2. The SMF initiates the authentication procedure with the DN-AAA via the UPF to authenticate the DN-specific identity provided by the UE as specified in TS 29.561.

When available, the SMF provides the GPSI in the signalling exchanged with the DN-AAA. The UPF transparently relays the message received from the SMF to the DN-AAA server.

3a. The DN-AAA server sends an Authentication/Authorization message towards the SMF. The message is carried via the UPF.

3b. Transfer of DN Request Container information received from DN-AAA towards the UE. In non-roaming and LBO cases, the SMF invokes the Namf_Communication_N1N2MessageTransfer service operation on the AMF to transfer the DN Request Container information within N1 SM information sent towards the UE.

In the case of Home Routed roaming, the H-SMF initiates a Nsmf_PDUSession_Update service operation to request the V-SMF to transfer DN Request Container to the UE and the V-SMF invokes the Namf_Communication_N1N2MessageTransfer service operation on the AMF to transfer the DN Request Container information within N1 SM information sent towards the UE. In Nsmf_PDUSession_Update Request, the H-SMF additionally includes the H-SMF SM Context ID.

3c: The AMF sends the N1 NAS message to the UE 3d-3e. Transfer of DN Request Container information received from UE towards the DN-AAA. When the UE responds with a N1 NAS message containing DN Request Container information, the AMF informs the SMF by invoking the Nsmf_PDUSession_UpdateSMContext service operation. The SMF issues an Nsmf_PDUSession_UpdateSMContext response.

In the case of Home Routed roaming, the V-SMF relays the N1 SM information to the H-SMF using the information of PDU Session received in step 3b via a Nsmf_PDUSession_Update service operation.

3f: The SMF (In HR case it is the H-SMF) sends the content of the DN Request Container information (authentication message) to the DN-AAA server via the UPF.

Step 3 may be repeated until the DN-AAA server confirms the successful authentication/authorization of the PDU Session.

4. The DN-AAA server confirms the successful authentication/authorization of the PDU Session. The DN-AAA server may provide:

an SM PDU DN Response Container to the SMF to indicate successful authentication/authorization;

DN Authorization Data as defined in TS 23.501 clause 5.6.6;

a request to get notified with the IP address(es) allocated to the PDU Session and/or with N6 traffic routing information or MAC address(es) used by the
UE for the PDU Session; and an IP address (or IPV6 Prefix) for the PDU Session.
The N6 traffic routing information is defined in TS
23.501 clause 5.6.7.

After the successful DN authentication/authorization, a
session is kept between the SMF and the DN-AAA. If
the SMF receives a DN Authorization Data, the SMF
uses the DN Authorization Profile Index to apply the
policy and charging control (see TS 23.501 clause
5.6.6).

5. The PDU Session establishment continues and com-
pletes.

6. If requested so in step 4 or if configured so by local
policies, the SMF notifies the DN-AAA with the
IP/MAC address(es) and/or with N6 traffic routing
information allocated to the PDU Session together with
the GPSI.

In both the NSSAA procedure and the Secondary Autho-
rization procedure, the authentication server resides in an
AAA-S outside of the 5GS system. In both procedures, the
AAA-S can also initiate procedures to re-authenticate or
revoke a previous authentication or authorization of the user
in the DNN or Slice. This AAA-S is one example of the
access control node 17 in FIGS. 1 and 4. For the secondary
authentication procedure, the SMF also receives the GPSI
from the UDM. Note that in some embodiments the AUSF
in the procedures is replaced by a new NF.

The GPSI assigned to a certain UE is stored as part of
subscription data in UDM/UDR. UDM provides GPSI to the
AMF as part of Access and Mobility subscription data and
to the SMF as part of the Session Management subscription
data.

The assignment of a GPSI to a UE subscription is here-
tofore Optional; i.e. NO GPSI may be available for the UE
in the subscription information stored in UDM/UDR and
thus AMF/SMF may not get any GPSI. In this case no GPSI
would be available for the Secondary authentication or
NSSAA procedures. This is a problem addressed by embodi-
ments illustrated in FIG. 1. These and other embodiments
effectively mandate the provisioning of at least one GPSI for
UEs which are assigned DNNs or Slices subject to Second-
ary authentication and/or NSSAA. That is, UEs which
subscription profiles include DNNs and/or Slices subject to
be authenticated by a AAA-Server shall be provisioned with
at least a GPSI. And some embodiments define the behavior
at the SMF (for Secondary authentication) and AMF (for
NSSAA) when the subscription data does not include any
GPSI.

Alternatively, a UE subscription may have multiple
GPSIs assigned. In this case, it would heretofore be unclear
which GPSI from the list provided by the UDM is to be used
for the Secondary authentication or NSSAA procedures.
This is a problem addressed by embodiments illustrated in
FIG. 4. These and other embodiments indicate which GPSI
is applicable for Secondary Authentication or NSSAA when
multiple GPSIs are assigned to a UE subscription.

Some embodiments herein thereby provide means for the
5GS to manage efficiently the GPSIs required for the execu-
tion of the Secondary Authentication and NSSAA proce-
dures.

Figure 13:
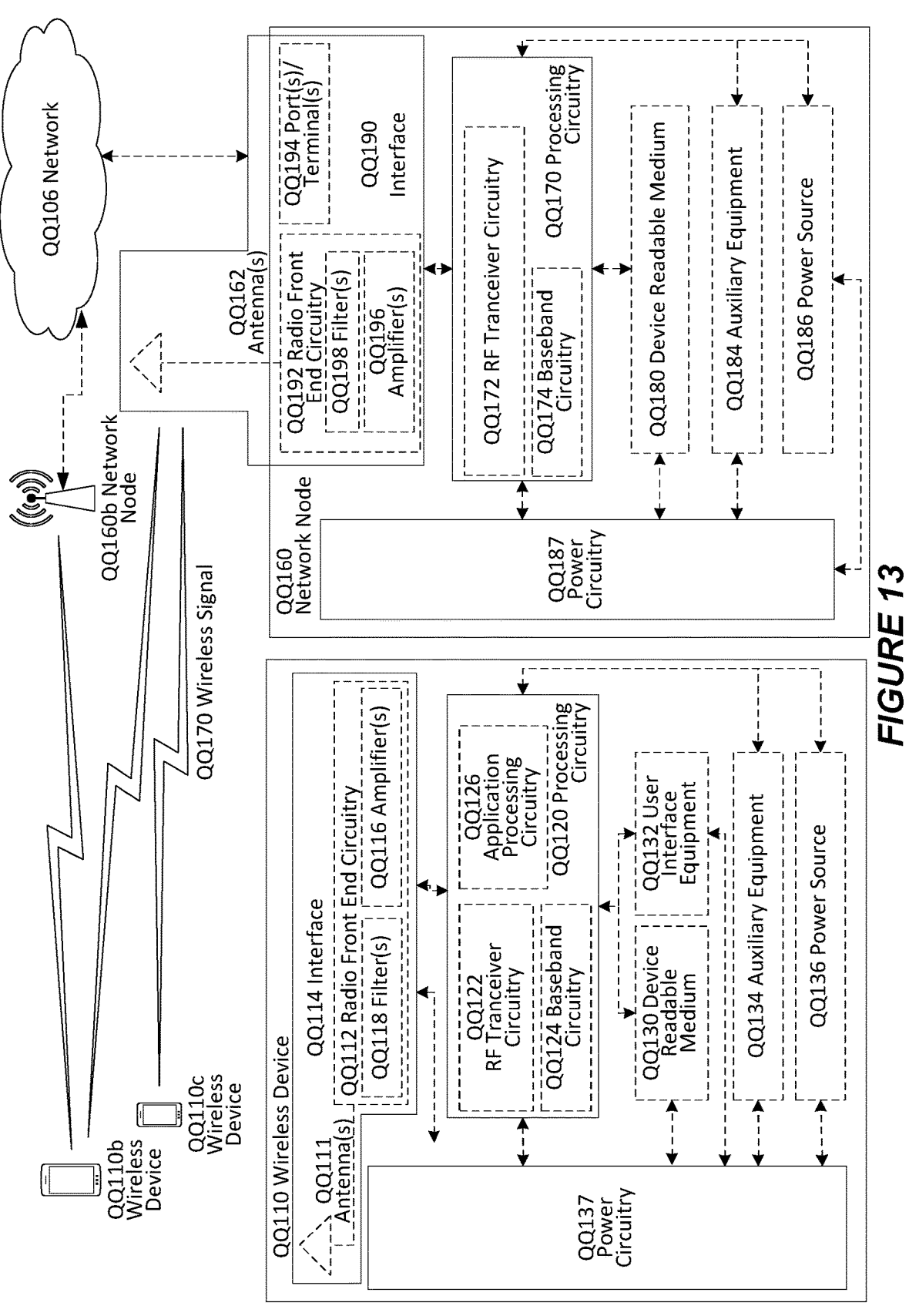
FIG. 13 is a block diagram of a wireless communication network according to some embodiments.

Although the subject matter described herein may be
implemented in any appropriate type of system using any
suitable components, the embodiments disclosed herein are
described in relation to a wireless network, such as the
example wireless network illustrated in FIG. 13. For sim-
plicity, the wireless network of FIG. 13 only depicts network 1306, network nodes 1360 and 1360b, and WDs 1310,
1310b, and 1310c. In practice, a wireless network may
further include any additional elements suitable to support
communication between wireless devices or between a
wireless device and another communication device, such as
a landline telephone, a service provider, or any other net-
work node or end device. Of the illustrated components,
network node 1360 and wireless device (WD) 1310 are
depicted with additional detail. The wireless network may
provide communication and other types of services to one or
more wireless devices to facilitate the wireless devices'
access to and/or use of the services provided by, or via, the
wireless network.

The wireless network may comprise and/or interface with
any type of communication, telecommunication, data, cel-
lular, and/or radio network or other similar type of system.
In some embodiments, the wireless network may be con-
figured to operate according to specific standards or other
types of predefined rules or procedures. Thus, particular
embodiments of the wireless network may implement com-
munication standards, such as Global System for Mobile
Communications (GSM), Universal Mobile Telecommuni-
cations System (UMTS), Long Term Evolution (LTE), Nar-
rowband Internet of Things (NB-IoT), and/or other suitable
2G, 3G, 4G, or 5G standards; wireless local area network
(WLAN) standards, such as the IEEE 802.11 standards;
and/or any other appropriate wireless communication stan-
dard, such as the Worldwide Interoperability for Microwave
Access (WiMax), Bluetooth, Z-Wave and/or ZigBee stan-
dards.

Network 1306 may comprise one or more backhaul
networks, core networks, IP networks, public switched tele-
phone networks (PSTNs), packet data networks, optical
networks, wide-area networks (WANs), local area networks
(LANs), wireless local area networks (WLANs), wired
networks, wireless networks, metropolitan area networks,
and other networks to enable communication between
devices.

Network node 1360 and WD 1310 comprise various
components described in more detail below. These compo-
nents work together in order to provide network node and/or
wireless device functionality, such as providing wireless
connections in a wireless network. In different embodi-
ments, the wireless network may comprise any number of
wired or wireless networks, network nodes, base stations,
controllers, wireless devices, relay stations, and/or any other
components or systems that may facilitate or participate in
the communication of data and/or signals whether via wired
or wireless connections.

As used herein, network node refers to equipment
capable, configured, arranged and/or operable to communi-
cate directly or indirectly with a wireless device and/or with
other network nodes or equipment in the wireless network to
enable and/or provide wireless access to the wireless device
and/or to perform other functions (e.g., administration) in
the wireless network. Examples of network nodes include,
but are not limited to, access points (APs) (e.g., radio access
points), base stations (BSs) (e.g., radio base stations, Node
Bs, evolved Node Bs (eNBs) and NR NodeBs (gNBs)). Base
stations may be categorized based on the amount of cover-
age they provide (or, stated differently, their transmit power
level) and may then also be referred to as femto base
stations, pico base stations, micro base stations, or macro
base stations. A base station may be a relay node or a relay
donor node controlling a relay. A network node may also
include one or more (or all) parts of a distributed radio base
station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 13, network node 1360 includes processing circuitry 1370, device readable medium 1380, interface 1390, auxiliary equipment 1384, power source 1386, power circuitry 1387, and antenna 1362. Although network node 1360 illustrated in the example wireless network of FIG. 13 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1360 are depicted as single boxes located within a larger box, or nested within multiple boxes, in practice, a network node may comprise multiple different physical components that make up a single illustrated component (e.g., device readable medium 1380 may comprise multiple separate hard drives as well as multiple RAM modules).

Similarly, network node 1360 may be composed of multiple physically separate components (e.g., a NodeB component and a RNC component, or a BTS component and a BSC component, etc.), which may each have their own respective components. In certain scenarios in which network node 1360 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1360 may be configured to support multiple radio access technologies (RATs). In such embodiments, some components may be duplicated (e.g., separate device readable medium 1380 for the different RATs) and some components may be reused (e.g., the same antenna 1362 may be shared by the RATs). Network node 1360 may also include multiple sets of the various illustrated components for different wireless technologies integrated into network node 1360, such as, for example, GSM, WCDMA, LTE, NR, WiFi, or Bluetooth wireless technologies. These wireless technologies may be integrated into the same or different chip or set of chips and other components within network node 1360.

Processing circuitry 1370 is configured to perform any determining, calculating, or similar operations (e.g., certain obtaining operations) described herein as being provided by a network node. These operations performed by processing circuitry 1370 may include processing information obtained by processing circuitry 1370 by, for example, converting the obtained information into other information, comparing the obtained information or converted information to information stored in the network node, and/or performing one or more operations based on the obtained information or converted information, and as a result of said processing making a determination.

Processing circuitry 1370 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1360 components, such as device readable medium 1380, network node 1360 functionality. For example, processing circuitry 1370 may execute instructions stored in device readable medium 1380 or in memory within processing circuitry 1370. Such functionality may include providing any of the various wireless features, functions, or benefits discussed herein. In some embodiments, processing circuitry 1370 may include a system on a chip (SOC).

In some embodiments, processing circuitry 1370 may include one or more of radio frequency (RF) transceiver circuitry 1372 and baseband processing circuitry 1374. In some embodiments, radio frequency (RF) transceiver circuitry 1372 and baseband processing circuitry 1374 may be on separate chips (or sets of chips), boards, or units, such as radio units and digital units. In alternative embodiments, part or all of RF transceiver circuitry 1372 and baseband processing circuitry 1374 may be on the same chip or set of chips, boards, or units In certain embodiments, some or all of the functionality described herein as being provided by a network node, base station, eNB or other such network device may be performed by processing circuitry 1370 executing instructions stored on device readable medium 1380 or memory within processing circuitry 1370. In alternative embodiments, some or all of the functionality may be provided by processing circuitry 1370 without executing instructions stored on a separate or discrete device readable medium, such as in a hard-wired manner. In any of those embodiments, whether executing instructions stored on a device readable storage medium or not, processing circuitry 1370 can be configured to perform the described functionality. The benefits provided by such functionality are not limited to processing circuitry 1370 alone or to other components of network node 1360, but are enjoyed by network node 1360 as a whole, and/or by end users and the wireless network generally.

Device readable medium 1380 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1370. Device readable medium 1380 may store any suitable instructions, data or information, including a computer program, software, an application including one or more of logic, rules, code, tables, etc. and/or other instructions capable of being executed by processing circuitry 1370 and, utilized by network node 1360. Device readable medium 1380 may be used to store any calculations made by processing circuitry 1370 and/or any data received via interface 1390. In some embodiments, processing circuitry 1370 and device readable medium 1380 may be considered to be integrated.

Interface 1390 is used in the wired or wireless communication of signalling and/or data between network node 1360, network 1306, and/or WDs 1310. As illustrated, interface 1390 comprises port(s)/terminal(s) 1394 to send and receive data, for example to and from network 1306 over a wired connection. Interface 1390 also includes radio front end circuitry 1392 that may be coupled to, or in certain embodiments a part of, antenna 1362. Radio front end circuitry 1392 comprises filters 1398 and amplifiers 1396. Radio front end circuitry 1392 may be connected to antenna 1362 and processing circuitry 1370. Radio front end circuitry may be configured to condition signals communicated between antenna 1362 and processing circuitry 1370. Radio front end circuitry 1392 may receive digital data that is to be sent out to other network nodes or WDs via a wireless connection. Radio front end circuitry 1392 may convert the digital data into a radio signal having the appropriate channel and bandwidth parameters using a combination of filters 1398 and/or amplifiers 1396. The radio signal may then be transmitted via antenna 1362. Similarly, when receiving data, antenna 1362 may collect radio signals which are then converted into digital data by radio front end circuitry 1392. The digital data may be passed to processing circuitry 1370. In other embodiments, the interface may comprise different components and/or different combinations of components.

In certain alternative embodiments, network node 1360 may not include separate radio front end circuitry 1392, instead, processing circuitry 1370 may comprise radio front end circuitry and may be connected to antenna 1362 without separate radio front end circuitry 1392. Similarly, in some embodiments, all or some of RF transceiver circuitry 1372 may be considered a part of interface 1390. In still other embodiments, interface 1390 may include one or more ports or terminals 1394, radio front end circuitry 1392, and RF transceiver circuitry 1372, as part of a radio unit (not shown), and interface 1390 may communicate with baseband processing circuitry 1374, which is part of a digital unit (not shown).

Antenna 1362 may include one or more antennas, or antenna arrays, configured to send and/or receive wireless signals. Antenna 1362 may be coupled to radio front end circuitry 1390 and may be any type of antenna capable of transmitting and receiving data and/or signals wirelessly. In some embodiments, antenna 1362 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1362 may be separate from network node 1360 and may be connectable to network node 1360 through an interface or port.

Antenna 1362, interface 1390, and/or processing circuitry 1370 may be configured to perform any receiving operations and/or certain obtaining operations described herein as being performed by a network node. Any information, data and/or signals may be received from a wireless device, another network node and/or any other network equipment. Similarly, antenna 1362, interface 1390, and/or processing circuitry 1370 may be configured to perform any transmitting operations described herein as being performed by a network node. Any information, data and/or signals may be transmitted to a wireless device, another network node and/or any other network equipment.

Power circuitry 1387 may comprise, or be coupled to, power management circuitry and is configured to supply the components of network node 1360 with power for performing the functionality described herein. Power circuitry 1387 may receive power from power source 1386. Power source 1386 and/or power circuitry 1387 may be configured to provide power to the various components of network node 1360 in a form suitable for the respective components (e.g., at a voltage and current level needed for each respective component). Power source 1386 may either be included in, or external to, power circuitry 1387 and/or network node 1360. For example, network node 1360 may be connectable to an external power source (e.g., an electricity outlet) via an input circuitry or interface such as an electrical cable, whereby the external power source supplies power to power circuitry 1387. As a further example, power source 1386 may comprise a source of power in the form of a battery or battery pack which is connected to, or integrated in, power circuitry 1387. The battery may provide backup power should the external power source fail. Other types of power sources, such as photovoltaic devices, may also be used.

Alternative embodiments of network node 1360 may include additional components beyond those shown in FIG. 13 that may be responsible for providing certain aspects of the network node's functionality, including any of the functionality described herein and/or any functionality necessary to support the subject matter described herein. For example, network node 1360 may include user interface equipment to allow input of information into network node 1360 and to allow output of information from network node 1360. This may allow a user to perform diagnostic, maintenance, repair, and other administrative functions for network node 1360.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1310 includes antenna 1311, interface 1314, processing circuitry 1320, device readable medium 1330, user interface equipment 1332, auxiliary equipment 1334, power source 1336 and power circuitry 1337. WD 1310 may include multiple sets of one or more of the illustrated components for different wireless technologies supported by WD 1310, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1310.

Antenna 1311 may include one or more antennas or antenna arrays, configured to send and/or receive wireless signals, and is connected to interface 1314. In certain alternative embodiments, antenna 1311 may be separate from WD 1310 and be connectable to WD 1310 through an interface or port. Antenna 1311, interface 1314, and/or processing circuitry 1320 may be configured to perform any receiving or transmitting operations described herein as being performed by a WD. Any information, data and/or signals may be received from a network node and/or another WD. In some embodiments, radio front end circuitry and/or antenna 1311 may be considered an interface.

As illustrated, interface 1314 comprises radio front end circuitry 1312 and antenna 1311. Radio front end circuitry 1312 comprise one or more filters 1318 and amplifiers 1316. Radio front end circuitry 1314 is connected to antenna 1311 and processing circuitry 1320, and is configured to condition signals communicated between antenna 1311 and processing circuitry 1320. Radio front end circuitry 1312 may be coupled to or a part of antenna 1311. In some embodiments, WD 1310 may not include separate radio front end circuitry 1312; rather, processing circuitry 1320 may comprise radio front end circuitry and may be connected to antenna 1311. Similarly, in some embodiments, some or all of RF transceiver circuitry 1322 may be considered a part of interface 1314. Radio front end circuitry 1312 may receive digital data that is to be sent out to other network nodes or WDs via a wireless connection. Radio front end circuitry 1312 may convert the digital data into a radio signal having the appropriate channel and bandwidth parameters using a combination of filters 1318 and/or amplifiers 1316. The radio signal may then be transmitted via antenna 1311. Similarly, when receiving data, antenna 1311 may collect radio signals which are then converted into digital data by radio front end circuitry 1312. The digital data may be passed to processing circuitry 1320. In other embodiments, the interface may comprise different components and/or different combinations of components.

Processing circuitry 1320 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1310 components, such as device readable medium 1330, WD 1310 functionality. Such functionality may include providing any of the various wireless features or benefits discussed herein. For example, processing circuitry 1320 may execute instructions stored in device readable medium 1330 or in memory within processing circuitry 1320 to provide the functionality disclosed herein.

As illustrated, processing circuitry 1320 includes one or more of RF transceiver circuitry 1322, baseband processing circuitry 1324, and application processing circuitry 1326. In other embodiments, the processing circuitry may comprise different components and/or different combinations of components. In certain embodiments processing circuitry 1320 of WD 1310 may comprise a SOC. In some embodiments, RF transceiver circuitry 1322, baseband processing circuitry 1324, and application processing circuitry 1326 may be on separate chips or sets of chips. In alternative embodiments, part or all of baseband processing circuitry 1324 and application processing circuitry 1326 may be combined into one chip or set of chips, and RF transceiver circuitry 1322 may be on a separate chip or set of chips. In still alternative embodiments, part or all of RF transceiver circuitry 1322 and baseband processing circuitry 1324 may be on the same chip or set of chips, and application processing circuitry 1326 may be on a separate chip or set of chips. In yet other alternative embodiments, part or all of RF transceiver circuitry 1322, baseband processing circuitry 1324, and application processing circuitry 1326 may be combined in the same chip or set of chips. In some embodiments, RF transceiver circuitry 1322 may be a part of interface 1314. RF transceiver circuitry 1322 may condition RF signals for processing circuitry 1320.

In certain embodiments, some or all of the functionality described herein as being performed by a WD may be provided by processing circuitry 1320 executing instructions stored on device readable medium 1330, which in certain embodiments may be a computer-readable storage medium. In alternative embodiments, some or all of the functionality may be provided by processing circuitry 1320 without executing instructions stored on a separate or discrete device readable storage medium, such as in a hard-wired manner. In any of those particular embodiments, whether executing instructions stored on a device readable storage medium or not, processing circuitry 1320 can be configured to perform the described functionality. The benefits provided by such functionality are not limited to processing circuitry 1320 alone or to other components of WD 1310, but are enjoyed by WD 1310 as a whole, and/or by end users and the wireless network generally.

Processing circuitry 1320 may be configured to perform any determining, calculating, or similar operations (e.g., certain obtaining operations) described herein as being performed by a WD. These operations, as performed by processing circuitry 1320, may include processing information obtained by processing circuitry 1320 by, for example, converting the obtained information into other information, comparing the obtained information or converted information to information stored by WD 1310, and/or performing one or more operations based on the obtained information or converted information, and as a result of said processing making a determination.

Device readable medium 1330 may be operable to store a computer program, software, an application including one or more of logic, rules, code, tables, etc. and/or other instructions capable of being executed by processing circuitry 1320. Device readable medium 1330 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1320. In some embodiments, processing circuitry 1320 and device readable medium 1330 may be considered to be integrated.

User interface equipment 1332 may provide components that allow for a human user to interact with WD 1310. Such interaction may be of many forms, such as visual, audial, tactile, etc. User interface equipment 1332 may be operable to produce output to the user and to allow the user to provide input to WD 1310. The type of interaction may vary depending on the type of user interface equipment 1332 installed in WD 1310. For example, if WD 1310 is a smart phone, the interaction may be via a touch screen; if WD 1310 is a smart meter, the interaction may be through a screen that provides usage (e.g., the number of gallons used) or a speaker that provides an audible alert (e.g., if smoke is detected). User interface equipment 1332 may include input interfaces, devices and circuits, and output interfaces, devices and circuits. User interface equipment 1332 is configured to allow input of information into WD 1310, and is connected to processing circuitry 1320 to allow processing circuitry 1320 to process the input information. User interface equipment 1332 may include, for example, a microphone, a proximity or other sensor, keys/buttons, a touch display, one or more cameras, a USB port, or other input circuitry. User interface equipment 1332 is also configured to allow output of information from WD 1310, and to allow processing circuitry 1320 to output information from WD 1310. User interface equipment 1332 may include, for example, a speaker, a display, vibrating circuitry, a USB port, a headphone interface, or other output circuitry. Using one or more input and output interfaces, devices, and circuits, of user interface equipment 1332, WD 1310 may communicate with end users and/or the wireless network, and allow them to benefit from the functionality described herein.

Auxiliary equipment 1334 is operable to provide more specific functionality which may not be generally performed by WDs. This may comprise specialized sensors for doing measurements for various purposes, interfaces for additional types of communication such as wired communications etc. The inclusion and type of components of auxiliary equipment 1334 may vary depending on the embodiment and/or scenario.

Power source 1336 may, in some embodiments, be in the form of a battery or battery pack. Other types of power sources, such as an external power source (e.g., an electricity outlet), photovoltaic devices or power cells, may also be used. WD 1310 may further comprise power circuitry 1337 for delivering power from power source 1336 to the various parts of WD 1310 which need power from power source 1336 to carry out any functionality described or indicated herein. Power circuitry 1337 may in certain embodiments comprise power management circuitry. Power circuitry 1337 may additionally or alternatively be operable to receive power from an external power source; in which case WD 1310 may be connectable to the external power source (such as an electricity outlet) via input circuitry or an interface such as an electrical power cable. Power circuitry 1337 may also in certain embodiments be operable to deliver power from an external power source to power source 1336. This may be, for example, for the charging of power source 1336. Power circuitry 1337 may perform any formatting, converting, or other modification to the power from power source 1336 to make the power suitable for the respective components of WD 1310 to which power is supplied.

Figure 14:
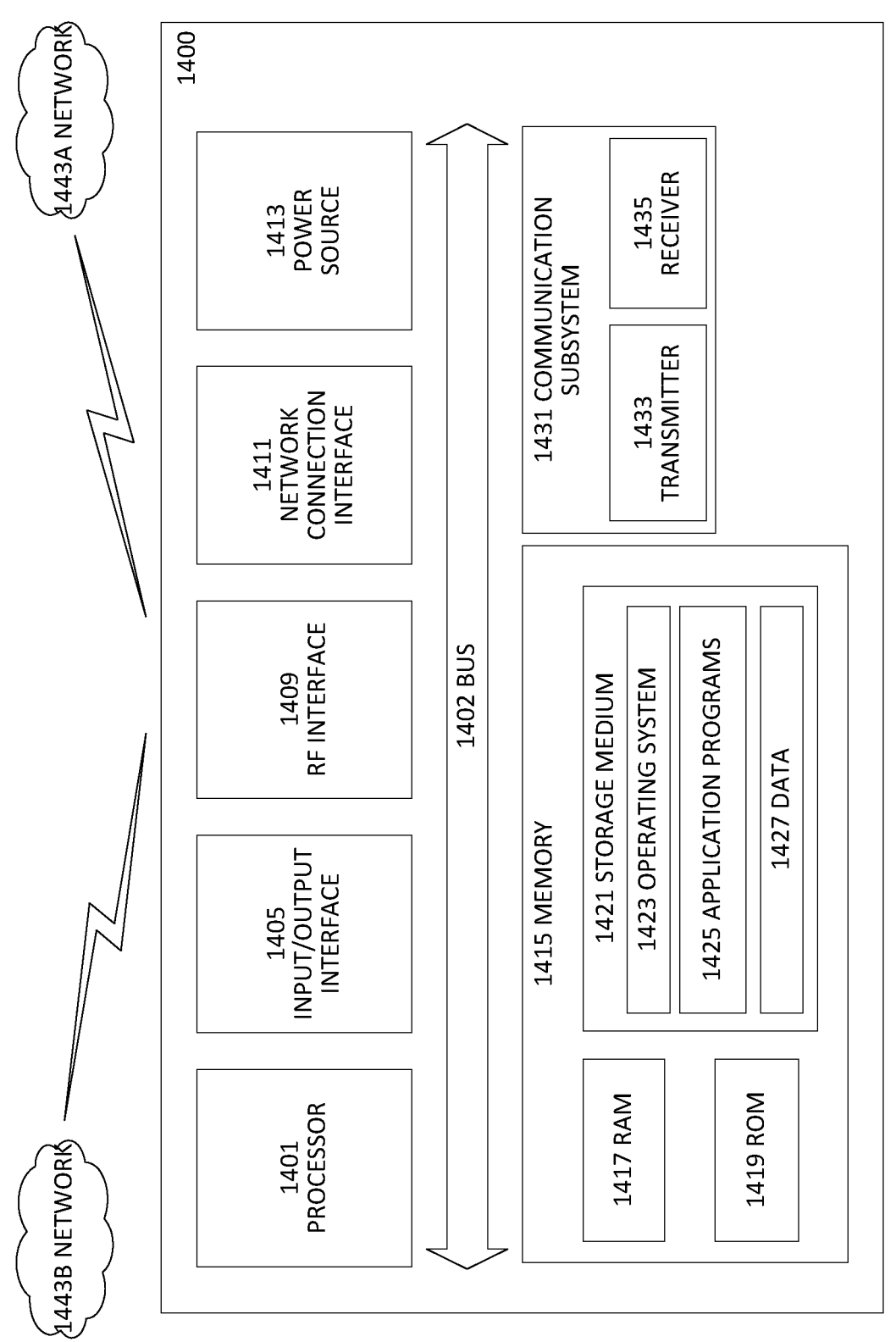
FIG. 14 is a block diagram of a user equipment according to some embodiments.

FIG. 14 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 14200 may be any UE identified by the $3^{rd}$ Generation Partnership Project (3GPP), including a NB-IoT UE, a machine type communication (MTC) UE, and/or an enhanced MTC (eMTC) UE. UE 1400, as illustrated in FIG. 14, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 14 is a UE, the components discussed herein are equally applicable to a WD, and vice-versa.

In FIG. 14, UE 1400 includes processing circuitry 1401 that is operatively coupled to input/output interface 1405, radio frequency (RF) interface 1409, network connection interface 1411, memory 1415 including random access memory (RAM) 1417, read-only memory (ROM) 1419, and storage medium 1421 or the like, communication subsystem 1431, power source 1433, and/or any other component, or any combination thereof. Storage medium 1421 includes operating system 1423, application program 1425, and data 1427. In other embodiments, storage medium 1421 may include other similar types of information. Certain UEs may utilize all of the components shown in FIG. 14, or only a subset of the components. The level of integration between the components may vary from one UE to another UE. Further, certain UEs may contain multiple instances of a component, such as multiple processors, memories, transceivers, transmitters, receivers, etc.

In FIG. 14, processing circuitry 1401 may be configured to process computer instructions and data. Processing circuitry 1401 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1401 may include two central processing units (CPUs). Data may be information in a form suitable for use by a computer.

In the depicted embodiment, input/output interface 1405 may be configured to provide a communication interface to an input device, output device, or input and output device. UE 1400 may be configured to use an output device via input/output interface 1405. An output device may use the same type of interface port as an input device. For example, a USB port may be used to provide input to and output from UE 1400. The output device may be a speaker, a sound card, a video card, a display, a monitor, a printer, an actuator, an emitter, a smartcard, another output device, or any combination thereof. UE 1400 may be configured to use an input device via input/output interface 1405 to allow a user to capture information into UE 1400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 14, RF interface 1409 may be configured to provide a communication interface to RF components such as a transmitter, a receiver, and an antenna. Network connection interface 1411 may be configured to provide a communication interface to network 1443a. Network 1443a may encompass wired and/or wireless networks such as a local-area network (LAN), a wide-area network (WAN), a computer network, a wireless network, a telecommunications network, another like network or any combination thereof. For example, network 1443a may comprise a Wi-Fi network. Network connection interface 1411 may be configured to include a receiver and a transmitter interface used to communicate with one or more other devices over a communication network according to one or more communication protocols, such as Ethernet, TCP/IP, SONET, ATM, or the like. Network connection interface 1411 may implement receiver and transmitter functionality appropriate to the communication network links (e.g., optical, electrical, and the like). The transmitter and receiver functions may share circuit components, software or firmware, or alternatively may be implemented separately.

RAM 1417 may be configured to interface via bus 1402 to processing circuitry 1401 to provide storage or caching of data or computer instructions during the execution of software programs such as the operating system, application programs, and device drivers. ROM 1419 may be configured to provide computer instructions or data to processing circuitry 1401. For example, ROM 1419 may be configured to store invariant low-level system code or data for basic system functions such as basic input and output (I/O), startup, or reception of keystrokes from a keyboard that are stored in a non-volatile memory. Storage medium 1421 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1421 may be configured to include operating system 1423, application program 1425 such as a web browser application, a widget or gadget engine or another application, and data file 1427. Storage medium 1421 may store, for use by UE 1400, any of a variety of various operating systems or combinations of operating systems.

Storage medium 1421 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1421 may allow UE 1400 to access computer-executable instructions, application programs or the like, stored on transitory or non-transitory memory media, to off-load data, or to upload data. An article of manufacture, such as one utilizing a communication system may be tangibly embodied in storage medium 1421, which may comprise a device readable medium.

In FIG. 14, processing circuitry 1401 may be configured to communicate with network 1443b using communication subsystem 1431. Network 1443a and network 1443b may be the same network or networks or different network or networks. Communication subsystem 1431 may be configured to include one or more transceivers used to communicate with network 1443b. For example, communication subsystem 1431 may be configured to include one or more transceivers used to communicate with one or more remote transceivers of another device capable of wireless communication such as another WD, UE, or base station of a radio access network (RAN) according to one or more communication protocols, such as IEEE 802.14, CDMA, WCDMA, GSM, LTE, UTRAN, WiMax, or the like. Each transceiver may include transmitter 1433 and/or receiver 1435 to implement transmitter or receiver functionality, respectively, appropriate to the RAN links (e.g., frequency allocations and the like). Further, transmitter 1433 and receiver 1435 of each transceiver may share circuit components, software or firmware, or alternatively may be implemented separately.

In the illustrated embodiment, the communication functions of communication subsystem 1431 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1431 may include cellular communication, Wi-Fi communication, Bluetooth communication, and GPS communication. Network 1443b may encompass wired and/or wireless networks such as a local-area network (LAN), a wide-area network (WAN), a computer network, a wireless network, a telecommunications network, another like network or any combination thereof. For example, network 1443b may be a cellular network, a Wi-Fi network, and/or a near-field network. Power source 1413 may be configured to provide alternating current (AC) or direct current (DC) power to components of UE 1400.

The features, benefits and/or functions described herein may be implemented in one of the components of UE 1400 or partitioned across multiple components of UE 1400. Further, the features, benefits, and/or functions described herein may be implemented in any combination of hardware, software or firmware. In one example, communication subsystem 1431 may be configured to include any of the components described herein. Further, processing circuitry 1401 may be configured to communicate with any of such components over bus 1402. In another example, any of such components may be represented by program instructions stored in memory that when executed by processing circuitry 1401 perform the corresponding functions described herein. In another example, the functionality of any of such components may be partitioned between processing circuitry 1401 and communication subsystem 1431. In another example, the non-computationally intensive functions of any of such components may be implemented in software or firmware and the computationally intensive functions may be implemented in hardware.

Figure 15:
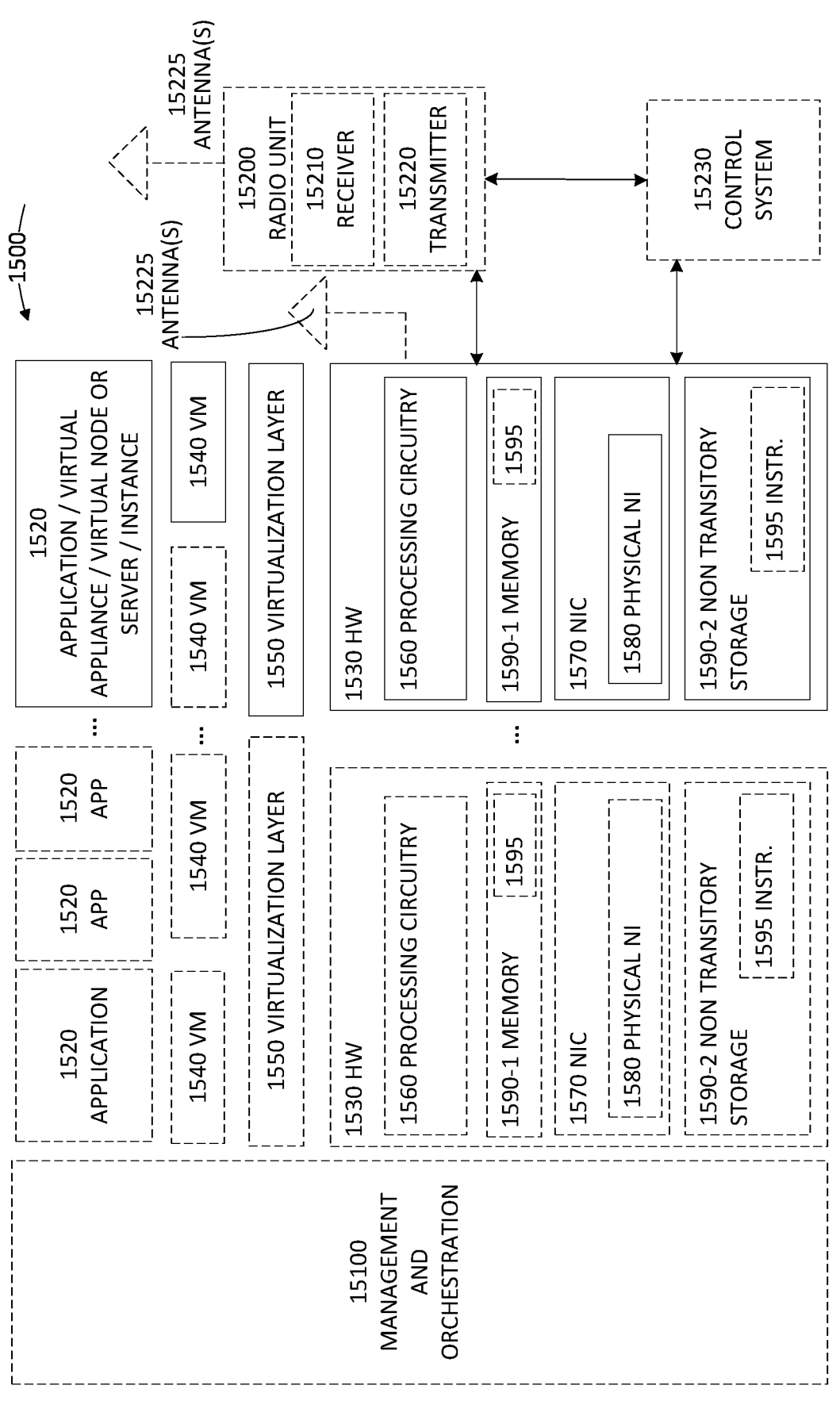
FIG. 15 is a block diagram of a virtualization environment according to some embodiments.

FIG. 15 is a schematic block diagram illustrating a virtualization environment 1500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1500 hosted by one or more of hardware nodes 1530. Further, in embodiments in which the virtual node is not a radio access node or does not require radio connectivity (e.g., a core network node), then the network node may be entirely virtualized.

The functions may be implemented by one or more applications 1520 (which may alternatively be called software instances, virtual appliances, network functions, virtual nodes, virtual network functions, etc.) operative to implement some of the features, functions, and/or benefits of some of the embodiments disclosed herein. Applications 1520 are run in virtualization environment 1500 which provides hardware 1530 comprising processing circuitry 1560 and memory 1590. Memory 1590 contains instructions 1595 executable by processing circuitry 1560 whereby application 1520 is operative to provide one or more of the features, benefits, and/or functions disclosed herein.

Virtualization environment 1500, comprises general-purpose or special-purpose network hardware devices 1530 comprising a set of one or more processors or processing circuitry 1560, which may be commercial off-the-shelf (COTS) processors, dedicated Application Specific Integrated Circuits (ASICs), or any other type of processing circuitry including digital or analog hardware components or special purpose processors. Each hardware device may comprise memory 1590-1 which may be non-persistent memory for temporarily storing instructions 1595 or software executed by processing circuitry 1560. Each hardware device may comprise one or more network interface controllers (NICs) 1570, also known as network interface cards, which include physical network interface 1580. Each hardware device may also include non-transitory, persistent, machine-readable storage media 1590-2 having stored therein software 1595 and/or instructions executable by processing circuitry 1560. Software 1595 may include any type of software including software for instantiating one or more virtualization layers 1550 (also referred to as hypervisors), software to execute virtual machines 1540 as well as software allowing it to execute functions, features and/or benefits described in relation with some embodiments described herein.

Virtual machines 1540, comprise virtual processing, virtual memory, virtual networking or interface and virtual storage, and may be run by a corresponding virtualization layer 1550 or hypervisor. Different embodiments of the instance of virtual appliance 1520 may be implemented on one or more of virtual machines 1540, and the implementations may be made in different ways.

During operation, processing circuitry 1560 executes software 1595 to instantiate the hypervisor or virtualization layer 1550, which may sometimes be referred to as a virtual machine monitor (VMM). Virtualization layer 1550 may present a virtual operating platform that appears like networking hardware to virtual machine 1540.

As shown in FIG. 15, hardware 1530 may be a standalone network node with generic or specific components. Hardware 1530 may comprise antenna 15225 and may implement some functions via virtualization. Alternatively, hardware 1530 may be part of a larger cluster of hardware (e.g. such as in a data center or customer premise equipment (CPE)) where many hardware nodes work together and are managed via management and orchestration (MANO) 15100, which, among others, oversees lifecycle management of applications 1520.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1540 may be a software implementation of a physical machine that runs programs as if they were executing on a physical, non-virtualized machine. Each of virtual machines 1540, and that part of hardware 1530 that executes that virtual machine, be it hardware dedicated to that virtual machine and/or hardware shared by that virtual machine with others of the virtual machines 1540, forms a separate virtual network elements (VNE).

Still in the context of NFV, Virtual Network Function (VNF) is responsible for handling specific network functions that run in one or more virtual machines 1540 on top of hardware networking infrastructure 1530 and corresponds to application 1520 in FIG. 15.

In some embodiments, one or more radio units 15200 that each include one or more transmitters 15220 and one or more receivers 15210 may be coupled to one or more antennas 15225. Radio units 15200 may communicate directly with hardware nodes 1530 via one or more appropriate network interfaces and may be used in combination with the virtual components to provide a virtual node with radio capabilities, such as a radio access node or a base station.

In some embodiments, some signalling can be effected with the use of control system 15230 which may alternatively be used for communication between the hardware nodes 1530 and radio units 15200.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The term "A and/or B" as used herein covers embodiments having A alone, B alone, or both A and B together. The term "A and/or B" may therefore equivalently mean "at least one of any one or more of A and B".

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Notably, modifications and other embodiments of the disclosed disclosure(s) will come to mind to one skilled in the art having the benefit of the teachings presented in the foregoing descriptions and the associated drawings. Therefore, it is to be understood that the disclosure(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The following are certain enumerated embodiments further illustrating various aspects the disclosed subject matter.

Group A Embodiments

A1. A method performed by network equipment in a wireless communication network, the method comprising:
obtaining subscription data for a wireless device; and
triggering, or refraining from triggering, a procedure for secondary or slice-specific access control of the wireless device, depending respectively on whether or not the obtained subscription data includes a generic subscription identifier for the wireless device, wherein the generic subscription identifier generically addresses a subscription to the wireless communication network in different data networks outside the wireless communication network.
A2. The method of embodiment A1, wherein the subscription data includes a Data Network Name, DNN, that identifies a data network to which the wireless device is subscribed and which is subject to secondary access control, wherein said secondary access control comprises secondary authentication and/or authorization, and wherein said triggering or refraining from triggering comprises triggering, or refraining from triggering, a procedure for the secondary authentication and/or authorization of the wireless device with respect to the data network, depending respectively on whether or not the obtained subscription data includes a generic subscription identifier for the wireless device.
A3. The method of embodiment A2, wherein the subscription data is obtained as part of, or during, a procedure for establishing a session between the wireless device and the data network.
A4. The method of embodiment A3, wherein the subscription data is obtained after or in response to receiving a request to establish the session, and wherein the method further comprises, after or based on refraining from triggering the procedure for the secondary authentication and/or authorization, rejecting the received request.
A5. The method of any of embodiments A1-A4, wherein the network equipment implements a session management function, SMF.
A6. The method of embodiment A1, wherein the subscription data includes Single Network Slice Selection Assistance Information, S-NSSAI, that identifies a network slice to which the wireless device is subscribed and which is subject to network slice-specific access control, wherein the network slice-specific access control comprises network slice-specific authentication and/or authorization, and wherein said triggering or refraining from triggering comprises triggering, or refraining from triggering, a procedure for the network slice-specific authentication and/or authorization of the wireless device with respect to the network slice, depending respectively on whether or not the obtained subscription data includes a generic subscription identifier for the wireless device.
A7. The method of embodiment A6, wherein the network equipment implements an access and mobility function, AMF.
A8. The method of any of embodiments A6-A7, wherein the subscription data is obtained as part of, or during, a procedure for registering the wireless device with the wireless communication network.
A9. The method of embodiment A8, wherein the subscription data is obtained after or in response to receiving a request to register the wireless device, and wherein the method further comprises, after or based on refraining from triggering the procedure for network slice-specific authentication and/or authorization, either rejecting the request or transmitting control signaling towards the wireless device that excludes the S-NSSAI from a list of one or more S-NSSAIs identifying one or more respective network slices that the wireless device is allowed to use.
A10. The method of any of embodiments A1-A9, wherein the generic subscription identifier is a Generic Public Subscription Identifier, GPSI.
A11. The method of any of embodiments A1-A10, wherein obtaining the subscription data comprises receiving the subscription data from a data management network node.
A12. The method of embodiment A11, wherein the data management network node implements a Unified Data Management, UDM, function or a User Data Repository, UDR.
AA1. A method performed by network equipment in a wireless communication network, the method comprising:
receiving, from a data management network node in the wireless communication network, control signaling that indicates which generic subscription identifier among one or more generic subscription identifiers in a list for a wireless device is to be used by default or is to be used for a secondary or slice-specific access control procedure, wherein each generic subscription identifier generically addresses a subscription to the wireless communication network in different data networks outside the wireless communication network.

AA2. The method of embodiment AA1, further comprising triggering the secondary or slice-specific access control procedure using the generic subscription identifier indicated by the control signaling.

AA3. The method of any of embodiments AA1-AA2, wherein the control signaling indicates which generic subscription identifier among one or more generic subscription identifiers in the list for the wireless device is to be used by default.

AA4. The method of embodiment AA3, wherein the control signaling includes the list, with an ordering of the one or more generic subscription identifiers indicating which generic subscription identifier among the one or more generic subscription identifiers in the list is to be used by default.

AA5. The method of any of embodiments AA3-AA4, wherein the first generic subscription identifier in the list is to be used by default.

AA6. The method of any of embodiments AA1-AA3, wherein the control signaling includes an information element that explicitly indicates which generic subscription identifier among one or more generic subscription identifiers in the list for the wireless device is to be used by default.

AA7. The method of any of embodiments AA1-AA2, wherein the control signaling indicates which generic subscription identifier among one or more generic subscription identifiers in the list for the wireless device is to be used for a secondary or slice-specific access control procedure.

AA8. The method of any of embodiments AA1-AA2 and AA7, wherein the control signaling includes an information element that explicitly indicates which generic subscription identifier among one or more generic subscription identifiers in the list for the wireless device is to be used for the secondary or slice-specific access control procedure.

AA9. The method of any of embodiments AA1-AA8, wherein the network equipment implements a session management function, SMF.

AA10. The method of any of embodiments AA1-AA8, wherein the network equipment implements an access and mobility function, AMF.

AA11. The method of any of embodiments AA1-AA10, wherein the one or more generic subscription identifiers comprise one or more Generic Public Subscription Identifiers, GPSIs.

AA12. The method of any of embodiments AA1-AA11, wherein the data management network node implements a Unified Data Management, UDM, function or a User Data Repository, UDR.

AA13. The method of any of embodiments AA1-AA12, wherein the secondary or slice-specific access control procedure comprises:

a secondary or slice-specific authentication procedure; and/or a secondary or slice-specific authorization procedure.

AA. The method of any of the previous embodiments, further comprising:

providing user data; and forwarding the user data to a host computer via the transmission to a base station.

Group B Embodiments

B1. A method performed by a data management network node in a wireless communication network, the method comprising:

storing subscription data for a wireless device, wherein the stored subscription data indicates the wireless device is subscribed to use a certain data network or network slice, wherein the certain data network or network slice is subject to secondary or slice-specific access control;

receiving, from network equipment, a request that requests subscription data for the wireless device; and responsive to the request, transmitting to the network equipment a response that includes at least some of the stored subscription data, wherein the response indicates or does not indicate the wireless device is subscribed to use the certain data network or network slice, depending respectively on whether or not the stored subscription data includes a generic subscription identifier for the wireless device, wherein the generic subscription identifier generically addresses a subscription to the wireless communication network in different data networks outside the wireless communication network.

B2. The method of embodiment B1, wherein the certain data network or network slice comprises a certain data network, wherein the secondary or slice-specific access control comprises secondary authentication and/or authorization, wherein the stored subscription data includes a Data Network Name, DNN, which identifies the certain data network, and wherein the response includes or does not include the DNN which identifies the certain data network, depending respectively on whether or not the stored subscription data includes a generic subscription identifier for the wireless device.

B3. The method of embodiment B2, wherein the response is transmitted as part of, or during, a procedure for establishing a session between the wireless device and the data network.

B4. The method of any of embodiments B1-B3, wherein the network equipment implements a session management function, SMF.

B5. The method of embodiment B1, wherein the certain data network or network slice comprises a certain network slice, wherein the secondary or slice-specific access control comprises slice-specific authentication and/or authorization, wherein the stored subscription data includes Single Network Slice Selection Assistance Information, S-NSSAI, that identifies the certain network slice, and wherein the response includes or does not include the S-NSSAI which identifies the certain network slice, depending respectively on whether or not the stored subscription data includes a generic subscription identifier for the wireless device.

B6. The method of embodiment B5, wherein the subscription data is obtained as part of, or during, a procedure for registering the wireless device with the wireless communication network.

B7. The method of any of embodiments B1 and B5-B6, wherein the network equipment implements an access and mobility function, AMF.

B8. The method of any of embodiments B1-B7, wherein the generic subscription identifier is a Generic Public Subscription Identifier, GPSI.

B9. The method of any of embodiments B1-B8, wherein the data management network node implements a Unified Data Management, UDM, function or a User Data Repository, UDR.

BB1. A method performed by a data management network node in a wireless communication network, the method comprising:

transmitting, to network equipment in the wireless communication network, control signaling that indicates which generic subscription identifier among one or more generic subscription identifiers in a list for a wireless device is to be used by default or is to be used for a secondary or slice-specific access control procedure, wherein each generic subscription identifier generically addresses a subscription to the wireless communication network in different data networks outside the wireless communication network.

BB2. The method of embodiment BB1, further comprising receiving, from the network equipment, a request for subscription data for the wireless device, and wherein the control signaling is transmitted as a response to the request.

BB3. The method of any of embodiments BB1-BB2, wherein the control signaling indicates which generic subscription identifier among one or more generic subscription identifiers in the list for the wireless device is to be used by default.

BB4. The method of embodiment BB3, wherein the control signaling includes the list, with an ordering of the one or more generic subscription identifiers indicating which generic subscription identifier among the one or more generic subscription identifiers in the list is to be used by default.

BB5. The method of any of embodiments BB3-BB4, wherein the first generic subscription identifier in the list is to be used by default.

BB6. The method of any of embodiments BB1-BB3, wherein the control signaling includes an information element that explicitly indicates which generic subscription identifier among one or more generic subscription identifiers in the list for the wireless device is to be used by default.

BB7. The method of any of embodiments BB1-BB2, wherein the control signaling indicates which generic subscription identifier among one or more generic subscription identifiers in the list for the wireless device is to be used for the secondary or slice-specific access control procedure.

BB8. The method of any of embodiments BB1-BB2 and BB7, wherein the control signaling includes an information element that explicitly indicates which generic subscription identifier among one or more generic subscription identifiers in the list for the wireless device is to be used for the secondary or slice-specific access control procedure.

BB9. The method of any of embodiments BB1-BB8, wherein the network equipment implements a session management function, SMF.

BB10. The method of any of embodiments BB1-BB8, wherein the network equipment implements an access and mobility function, AMF.

BB11. The method of any of embodiments BB1-BB10, wherein the one or more generic subscription identifiers comprise one or more Generic Public Subscription Identifiers, GPSIs.

BB12. The method of any of embodiments BB1-BB11, wherein the data management network node implements a Unified Data Management, UDM, function or a User Data Repository, UDR.

BB13. The method of any of embodiments BB1-BB12, wherein the secondary or slice-specific access control procedure comprises:

a secondary or slice-specific authentication procedure; and/or a secondary or slice-specific authorization procedure.

BB. The method of any of the previous embodiments, further comprising:

obtaining user data; and forwarding the user data to a host computer or a wireless device.

Group C Embodiments

C1. Network equipment configured to perform any of the steps of any of the Group A embodiments.

C2. Network equipment comprising processing circuitry configured to perform any of the steps of any of the Group A embodiments.

C3. Network equipment comprising:
communication circuitry; and
processing circuitry configured to perform any of the steps of any of the Group A embodiments.

C4. Network equipment comprising:
processing circuitry configured to perform any of the steps of any of the Group A embodiments; and
power supply circuitry configured to supply power to the network equipment.

C5. Network equipment comprising:
processing circuitry and memory, the memory containing instructions executable by the processing circuitry whereby the network equipment is configured to perform any of the steps of any of the Group A embodiments.

C6. Reserved.

C7. A computer program comprising instructions which, when executed by at least one processor of network equipment, causes the network equipment to carry out the steps of any of the Group A embodiments.

C8. A carrier containing the computer program of embodiment C7, wherein the carrier is one of an electronic signal, optical signal, radio signal, or computer readable storage medium.

C9. A data management network node configured to perform any of the steps of any of the Group B embodiments.

C10. A data management network node comprising processing circuitry configured to perform any of the steps of any of the Group B embodiments.

C11. A data management network node comprising:
communication circuitry; and
processing circuitry configured to perform any of the steps of any of the Group B embodiments.

C12. A data management network node comprising:
processing circuitry configured to perform any of the steps of any of the Group B embodiments;
power supply circuitry configured to supply power to the data management network node.

C13. A data management network node comprising:
processing circuitry and memory, the memory containing instructions executable by the processing circuitry whereby the data management network node is configured to perform any of the steps of any of the Group B embodiments.

C14. The data management network node of any of embodiments C9-C13, wherein the data management network node implements a Unified Data Management, UDM, function.

C15. A computer program comprising instructions which, when executed by at least one processor of a data management network node, causes the data management network node to carry out the steps of any of the Group B embodiments.

C16. The computer program of embodiment C14, wherein the data management network node implements a Unified Data Management, UDM, function.

C17. A carrier containing the computer program of any of embodiments C15-C16, wherein the carrier is one of an electronic signal, optical signal, radio signal, or computer readable storage medium.

What is claimed is:

1. A method performed by a data management network node in a wireless communication network, the method comprising:

storing subscription data for a wireless device;

receiving, from network equipment, a request that requests subscription data for the wireless device; and responsive to the request, transmitting to the network equipment a response that includes at least some of the stored subscription data, wherein if the subscription data included in the response indicates the wireless device is subscribed to use a certain data network or network slice that is subject to secondary or slice-specific access control, the subscription data included in the response includes at least one generic subscription identifier for the wireless device, wherein a generic subscription identifier generically addresses a subscription to the wireless communication network in different data networks outside the wireless communication network, wherein the response includes or does not include information which identifies the certain data network or network slice depending respectively on whether or not the stored subscription data includes a generic subscription identifier for the wireless device.

2. The method of claim 1, further comprising checking whether the stored subscription data indicates the wireless device is subscribed to use a certain data network or network slice that is subject to secondary or slice-specific access control, and wherein if the subscription data included in the response indicates the wireless device is subscribed to use the certain data network or network slice that is subject to secondary or slice-specific access control according to said checking, the subscription data included in the response includes at least one generic subscription identifier for the wireless device.

3. The method of claim 1, wherein the certain data network or network slice comprises a certain network slice, wherein the secondary or slice-specific access control comprises slice-specific authentication and/or authorization, and wherein the stored subscription data includes Single Network Slice Selection Assistance Information (S-NSSAI) that identifies the certain network slice, wherein if the subscription data included in the response includes S-NSSAI identifying a certain network slice that is subject to slice-specific authentication and/or authorization, the subscription data included in the response also includes at least one generic subscription identifier for the wireless device.

4. The method of claim 3, wherein the response includes or does not include the S-NSSAI which identifies the certain network slice, depending respectively on whether or not the stored subscription data includes a generic subscription identifier for the wireless device.

5. The method of claim 1, wherein the certain data network or network slice comprises a certain data network, wherein the secondary or slice-specific access control comprises secondary authentication and/or authorization, and wherein the stored subscription data includes a Data Network Name (DNN) which identifies the certain data network, wherein if the subscription data included in the response includes a DNN identifying a certain data network that is subject to secondary authentication and/or authorization, the subscription data included in the response also includes at least one generic subscription identifier for the wireless device.

6. The method of claim 5, wherein the response includes or does not include the DNN which identifies the certain data network that is subject to secondary authentication and/or authorization, depending respectively on whether or not the stored subscription data includes a generic subscription identifier for the wireless device.

7. The method of claim 1, wherein the generic subscription identifier is a Generic Public Subscription Identifier (GPSI).

8. The method of claim 1, wherein, if the stored subscription data indicates the wireless device is subscribed to use the certain data network or network slice but the stored subscription data lacks a generic subscription identifier for the wireless device, the response does not indicate that the wireless device is subscribed to use the certain data network or network slice.

9. A data management network node configured for use in a wireless communication network, the data management network node comprising:

communication circuitry; and processing circuitry configured to:

store subscription data for a wireless device;

receive, from network equipment, a request that requests subscription data for the wireless device; and responsive to the request, transmit to the network equipment a response that includes at least some of the stored subscription data, wherein if the subscription data included in the response indicates the wireless device is subscribed to use a certain data network or network slice that is subject to secondary or slice-specific access control, the subscription data included in the response includes at least one generic subscription identifier for the wireless device, wherein a generic subscription identifier generically addresses a subscription to the wireless communication network in different data networks outside the wireless communication network, wherein the response includes or does not include information which identifies the certain data network or network slice depending respectively on whether or not the stored subscription data includes a generic subscription identifier for the wireless device.

10. The data management network node of claim 9, the processing circuitry configured to perform a check whether the stored subscription data indicates the wireless device is subscribed to use a certain data network or network slice that is subject to secondary or slice-specific access control, and wherein if the subscription data included in the response indicates the wireless device is subscribed to use the certain data network or network slice that is subject to secondary or slice-specific access control according to said check, the subscription data included in the response includes at least one generic subscription identifier for the wireless device.

11. The data management network node of claim 9, wherein the certain data network or network slice comprises a certain network slice, wherein the secondary or slice-specific access control comprises slice-specific authentication and/or authorization, and wherein the stored subscription data includes Single Network Slice Selection Assistance Information (S-NSSAI) that identifies the certain network slice, wherein if the subscription data included in the response includes S-NSSAI identifying a certain network slice that is subject to slice-specific authentication and/or authorization, the subscription data included in the response also includes at least one generic subscription identifier for the wireless device.

12. The data management network node of claim 11, wherein the response includes or does not include the S-NSSAI which identifies the certain network slice, depending respectively on whether or not the stored subscription data includes a generic subscription identifier for the wireless device.

13. The data management network node of claim 9, wherein the certain data network or network slice comprises a certain data network, wherein the secondary or slice-specific access control comprises secondary authentication and/or authorization, and wherein the stored subscription data includes a Data Network Name (DNN) which identifies the certain data network, wherein if the subscription data included in the response includes a DNN identifying a certain data network that is subject to secondary authentication and/or authorization, the subscription data included in the response also includes at least one generic subscription identifier for the wireless device.

14. The data management network node of claim 13, wherein the response includes or does not include the DNN which identifies the certain data network that is subject to secondary authentication and/or authorization, depending respectively on whether or not the stored subscription data includes a generic subscription identifier for the wireless device.

15. The data management network node of claim 9, wherein the generic subscription identifier is a Generic Public Subscription Identifier (GPSI).

16. The data management network node of claim 9, wherein the processing circuitry is configured to generate the response such that, if the stored subscription data indicates the wireless device is subscribed to use the certain data network or network slice but the stored subscription data lacks a generic subscription identifier for the wireless device, the response does not indicate that the wireless device is subscribed to use the certain data network or network slice.

* * * * *